US011300746B2

(12) United States Patent
Dannoux et al.

(10) Patent No.: US 11,300,746 B2
(45) Date of Patent: Apr. 12, 2022

(54) FIBER OPTIC PORT MODULE INSERTS, ASSEMBLIES AND METHODS OF MAKING THE SAME

(71) Applicant: Corning Research & Development Corporation, Corning, NY (US)

(72) Inventors: Thierry Luc Alain Dannoux, Avon (FR); Felice Scotta, Savingny le Temple (FR); Shane C. Woody, Mooresville, NC (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 16/661,987

(22) Filed: Oct. 23, 2019

(65) Prior Publication Data

US 2020/0057222 A1    Feb. 20, 2020

Related U.S. Application Data

(63) Continuation of application No. PCT/US2018/040126, filed on Jun. 28, 2018, and a
(Continued)

(51) Int. Cl.
*G02B 6/44* (2006.01)
*G02B 6/38* (2006.01)

(52) U.S. Cl.
CPC ......... *G02B 6/4446* (2013.01); *G02B 6/3893* (2013.01); *G02B 6/3897* (2013.01)

(58) Field of Classification Search
CPC .................................................. G02B 6/4446
See application file for complete search history.

(56) References Cited

U.S. PATENT DOCUMENTS 3,792,284 A    2/1974 Kaelin
3,912,362 A    10/1975 Hudson
(Continued)

FOREIGN PATENT DOCUMENTS

AU    2006232206 A1    10/2006
CN    1060911 A    5/1992
(Continued)

OTHER PUBLICATIONS

Coaxum, L., et al., U.S. Appl. No. 62/341,947, "Fiber Optic Multiport Having Different Types of Ports for Multi-Use," filed May 26, 2016.
(Continued)

*Primary Examiner* — Sung H Pak
(74) *Attorney, Agent, or Firm* — Michael E. Carroll, Jr.

(57) ABSTRACT

Devices such as port module inserts comprising connection ports with associated securing features and methods for making the same are disclosed. In one embodiment, the port module insert comprises a housing, at least one connection port, at least one securing feature passageway, and at least one securing feature. The at least one connection port is disposed on the port module insert with the at least one connection port comprising an optical connector opening extending from an outer surface of the port module insert to a cavity of the port module insert and defining a connection port passageway. The at least one securing feature is associated with the connection port passageway, and the at least one securing feature is disposed within a portion of the at least one securing feature passageway.

46 Claims, 17 Drawing Sheets

Related U.S. Application Data continuation-in-part of application No. PCT/US2018/039494, filed on Jun. 26, 2018, and a continuation-in-part of application No. 16/018,918, filed on Jun. 26, 2018, now Pat. No. 10,379,298, and a continuation-in-part of application No. 16/019,008, filed on Jun. 26, 2018, now Pat. No. 10,429,594, and a continuation-in-part of application No. PCT/US2018/039485, filed on Jun. 26, 2018, and a continuation-in-part of application No. 16/018,988, filed on Jun. 26, 2018, now Pat. No. 10,359,577, and a continuation-in-part of application No. PCT/US2018/039484, filed on Jun. 26, 2018, and a continuation-in-part of application No. PCT/US2017/064092, filed on Nov. 30, 2017, and a continuation-in-part of application No. PCT/US2017/064095, filed on Nov. 30, 2017.

(60) Provisional application No. 62/526,195, filed on Jun. 28, 2017.

(56) References Cited

U.S. PATENT DOCUMENTS

| | | |
|---|---|---|
| 4,148,557 A | 4/1979 | Garvey |
| 4,167,303 A | 9/1979 | Bowen et al. |
| 4,168,109 A | 9/1979 | Dumire |
| 4,336,977 A | 6/1982 | Monaghan et al. |
| 4,373,777 A | 2/1983 | Borsuk et al. |
| 4,413,880 A | 11/1983 | Forrest et al. |
| 4,423,922 A | 1/1984 | Porter |
| 4,440,471 A | 4/1984 | Knowles |
| 4,461,537 A | 7/1984 | Raymer et al. |
| 4,547,937 A | 10/1985 | Collins |
| 4,615,581 A | 10/1986 | Morimoto |
| 4,634,858 A | 1/1987 | Gerdt et al. |
| 4,688,200 A | 8/1987 | Poorman et al. |
| 4,690,563 A | 9/1987 | Barton et al. |
| 4,711,752 A | 12/1987 | Deacon et al. |
| 4,723,827 A | 2/1988 | Shaw et al. |
| 4,741,590 A | 5/1988 | Caron |
| 4,842,363 A | 6/1989 | Margolin et al. |
| 4,844,570 A | 7/1989 | Tanabe |
| 4,877,303 A | 10/1989 | Caldwell et al. |
| 4,944,568 A | 7/1990 | Danbach et al. |
| 4,979,792 A | 12/1990 | Weber et al. |
| 5,007,860 A | 4/1991 | Robinson et al. |
| 5,067,783 A | 11/1991 | Lampert |
| 5,073,042 A | 12/1991 | Mulholland et al. |
| 5,076,656 A | 12/1991 | Briggs et al. |
| 5,085,492 A | 2/1992 | Kelsoe et al. |
| 5,088,804 A | 2/1992 | Grinderslev |
| 5,091,990 A | 2/1992 | Leung et al. |
| 5,131,735 A | 7/1992 | Berkey et al. |
| 5,142,602 A | 8/1992 | Cabato et al. |
| 5,146,519 A | 9/1992 | Miller et al. |
| 5,155,900 A | 10/1992 | Grois et al. |
| 5,210,810 A | 5/1993 | Darden et al. |
| 5,212,752 A | 5/1993 | Stephenson et al. |
| 5,224,187 A | 6/1993 | Davisdon |
| 5,231,685 A | 7/1993 | Hanzawa et al. |
| 5,245,683 A | 9/1993 | Belenkiy et al. |
| 5,276,750 A | 1/1994 | Manning |
| 5,317,663 A | 5/1994 | Beard et al. |
| 5,321,917 A | 6/1994 | Franklin et al. |
| 5,375,183 A | 12/1994 | Edwards et al. |
| 5,381,494 A | 1/1995 | O'Donnell et al. |
| 5,390,269 A | 2/1995 | Palecek et al. |
| 5,408,570 A | 4/1995 | Cook et al. |
| 5,425,121 A | 6/1995 | Cooke et al. |
| 5,452,388 A | 9/1995 | Rittle et al. |
| 5,519,799 A | 5/1996 | Murakami et al. |
| 5,553,186 A | 9/1996 | Allen |
| 5,557,696 A | 9/1996 | Stein |
| 5,569,050 A | 10/1996 | Lloyd |
| 5,588,077 A | 12/1996 | Woodside |
| 5,600,747 A | 2/1997 | Yamakawa et al. |
| 5,603,631 A | 2/1997 | Kawahara et al. |
| 5,608,828 A | 3/1997 | Coutts et al. |
| 5,631,993 A | 5/1997 | Cloud et al. |
| 5,647,045 A | 7/1997 | Robinson et al. |
| 5,673,346 A | 9/1997 | Iwano et al. |
| 5,694,507 A | 12/1997 | Walles |
| 5,748,821 A | 5/1998 | Schempp et al. |
| 5,761,359 A | 6/1998 | Chudoba et al. |
| 5,781,686 A | 7/1998 | Robinson et al. |
| 5,782,892 A | 7/1998 | Castle et al. |
| 5,790,740 A | 8/1998 | Cloud et al. |
| 5,791,918 A | 8/1998 | Pierce |
| 5,796,895 A | 8/1998 | Jennings et al. |
| RE35,935 E | 10/1998 | Cabato et al. |
| 5,818,993 A | 10/1998 | Chudoba et al. |
| 5,857,050 A | 1/1999 | Jiang et al. |
| 5,862,290 A | 1/1999 | Burek et al. |
| 5,883,999 A | 3/1999 | Cloud et al. |
| 5,884,000 A | 3/1999 | Cloud et al. |
| 5,884,001 A | 3/1999 | Cloud et al. |
| 5,884,002 A | 3/1999 | Cloud et al. |
| 5,884,003 A | 3/1999 | Cloud et al. |
| 5,887,099 A | 3/1999 | Csipkes et al. |
| 5,920,669 A | 7/1999 | Knecht et al. |
| 5,925,191 A | 7/1999 | Stein et al. |
| 5,926,596 A | 7/1999 | Edwards et al. |
| 5,960,141 A | 9/1999 | Sasaki et al. |
| 5,961,344 A | 10/1999 | Rosales et al. |
| 5,971,626 A | 10/1999 | Knodell et al. |
| RE36,592 E | 2/2000 | Giebel et al. |
| 6,030,129 A | 2/2000 | Rosson |
| 6,035,084 A | 3/2000 | Haake et al. |
| 6,045,270 A | 4/2000 | Weiss et al. |
| 6,094,517 A | 7/2000 | Yuuki |
| 6,108,482 A | 8/2000 | Roth |
| 6,112,006 A | 8/2000 | Foss |
| 6,179,482 B1 | 1/2001 | Takizawa et al. |
| 6,193,421 B1 | 2/2001 | Tamekuni et al. |
| RE37,079 E | 3/2001 | Stephenson et al. |
| RE37,080 E | 3/2001 | Stephenson et al. |
| 6,200,040 B1 | 3/2001 | Edwards et al. |
| 6,206,581 B1 | 3/2001 | Driscoll et al. |
| 6,220,762 B1 | 4/2001 | Kanai et al. |
| 6,224,268 B1 | 5/2001 | Manning et al. |
| 6,224,270 B1 | 5/2001 | Nakajima et al. |
| 6,293,710 B1 | 9/2001 | Lampert et al. |
| 6,298,190 B2 | 10/2001 | Waldron et al. |
| 6,356,390 B1 | 3/2002 | Hall, Jr. |
| 6,375,363 B1 | 4/2002 | Harrison et al. |
| 6,402,388 B1 | 6/2002 | Imazu et al. |
| 6,404,962 B1 | 6/2002 | Hardwick et al. |
| 6,409,391 B1 | 6/2002 | Chang |
| 6,427,035 B1 | 7/2002 | Mahony |
| 6,428,215 B1 | 8/2002 | Nault |
| 6,466,725 B2 | 10/2002 | Battey et al. |
| 6,496,641 B1 | 12/2002 | Mahony |
| 6,522,804 B1 | 2/2003 | Mahony |
| 6,533,468 B2 | 3/2003 | Nakajima et al. |
| 6,536,956 B2 | 3/2003 | Luther et al. |
| 6,542,652 B1 | 4/2003 | Mahony |
| 6,554,489 B2 | 4/2003 | Kent et al. |
| 6,625,375 B1 | 9/2003 | Mahony |
| 6,629,782 B2 | 10/2003 | McPhee et al. |
| 6,672,774 B2 | 1/2004 | Theuerkorn et al. |
| 6,678,442 B2 | 1/2004 | Gall et al. |
| 6,695,489 B2 | 2/2004 | Nault |
| 6,702,475 B1 | 3/2004 | Giobbio et al. |
| 6,738,555 B1 | 5/2004 | Cooke et al. |
| 6,748,146 B2 | 6/2004 | Parris |
| 6,771,861 B2 | 8/2004 | Wagner et al. |
| 6,789,950 B1 | 9/2004 | Loder et al. |
| 6,841,729 B2 | 1/2005 | Sakabe et al. |
| 6,856,748 B1 | 2/2005 | Elkins et al. |
| 6,877,906 B2 | 4/2005 | Mizukami et al. |
| 6,880,219 B2 | 4/2005 | Griffioen et al. |
| 6,908,233 B2 | 6/2005 | Nakajima et al. |
| 6,916,120 B2 | 7/2005 | Zimmel et al. |

(56) References Cited

U.S. PATENT DOCUMENTS

| | | |
|---|---|---|
| 6,944,387 B2 | 9/2005 | Howell et al. |
| 6,962,445 B2 | 11/2005 | Zimmel et al. |
| 6,970,629 B2 | 11/2005 | Lail et al. |
| 6,983,095 B2 | 1/2006 | Reagan et al. |
| 7,013,074 B2 | 3/2006 | Battey et al. |
| 7,044,650 B1 | 5/2006 | Tran et al. |
| 7,052,185 B2 | 5/2006 | Rubino et al. |
| 7,088,899 B2 | 8/2006 | Reagan et al. |
| 7,103,255 B2 | 9/2006 | Reagan et al. |
| 7,103,257 B2 | 9/2006 | Donaldson et al. |
| 7,118,283 B2 | 10/2006 | Nakajima et al. |
| 7,118,284 B2 | 10/2006 | Nakajima et al. |
| 7,120,347 B2 | 10/2006 | Blackwell, Jr. et al. |
| 7,146,089 B2 | 12/2006 | Reagan et al. |
| 7,150,567 B1 | 12/2006 | Luther et al. |
| 7,171,102 B2 | 1/2007 | Reagan et al. |
| 7,195,403 B2 | 3/2007 | Oki et al. |
| 7,200,317 B2 | 4/2007 | Reagan et al. |
| 7,201,518 B2 | 4/2007 | Holmquist |
| 7,213,975 B2 | 5/2007 | Khemakhem et al. |
| 7,213,980 B2 | 5/2007 | Oki et al. |
| 7,228,047 B1 | 6/2007 | Szilagyi et al. |
| 7,232,260 B2 | 6/2007 | Takahashi et al. |
| 7,236,670 B2 | 6/2007 | Lail et al. |
| 7,260,301 B2 | 8/2007 | Barth et al. |
| 7,261,472 B2 | 8/2007 | Suzuki et al. |
| 7,266,265 B2 | 9/2007 | Gall et al. |
| 7,266,274 B2 | 9/2007 | Elkins et al. |
| 7,277,614 B2 | 10/2007 | Cody et al. |
| 7,279,643 B2 | 10/2007 | Morrow et al. |
| 7,292,763 B2 | 11/2007 | Smith et al. |
| 7,302,152 B2 | 11/2007 | Luther et al. |
| 7,318,677 B2 | 1/2008 | Dye |
| 7,326,091 B2 | 2/2008 | Nania et al. |
| 7,330,629 B2 | 2/2008 | Cooke et al. |
| 7,333,708 B2 | 2/2008 | Blackwell, Jr. et al. |
| 7,336,873 B2 | 2/2008 | Lail et al. |
| 7,341,382 B2 | 3/2008 | Dye |
| 7,346,256 B2 | 3/2008 | Marrs et al. |
| 7,349,605 B2 | 3/2008 | Noonan et al. |
| 7,357,582 B2 | 4/2008 | Oki et al. |
| 7,366,416 B2 | 4/2008 | Ramachandran et al. |
| 7,394,964 B2 | 7/2008 | Tinucci et al. |
| 7,397,997 B2 | 7/2008 | Ferris et al. |
| 7,400,815 B2 | 7/2008 | Mertesdorf et al. |
| 7,407,332 B2 | 8/2008 | Oki et al. |
| 7,428,366 B2 | 9/2008 | Mullaney et al. |
| 7,444,056 B2 | 10/2008 | Allen et al. |
| 7,454,107 B2 | 11/2008 | Miller et al. |
| 7,463,803 B2 | 12/2008 | Cody et al. |
| 7,469,091 B2 | 12/2008 | Mullaney et al. |
| 7,477,824 B2 | 1/2009 | Reagan et al. |
| 7,480,437 B2 | 1/2009 | Ferris et al. |
| 7,484,898 B2 | 2/2009 | Katagiyama et al. |
| 7,485,804 B2 | 2/2009 | Dinh et al. |
| 7,489,849 B2 | 2/2009 | Reagan et al. |
| 7,492,996 B2 | 2/2009 | Kowalczyk et al. |
| 7,520,678 B2 | 4/2009 | Khemakhem et al. |
| 7,539,387 B2 | 5/2009 | Mertesdorf et al. |
| 7,539,388 B2 | 5/2009 | Mertesdorf et al. |
| 7,542,645 B1 | 6/2009 | Hua et al. |
| 7,559,702 B2 | 7/2009 | Fujiwara et al. |
| 7,565,055 B2 | 7/2009 | Lu et al. |
| 7,568,845 B2 | 8/2009 | Caveney et al. |
| 7,572,065 B2 | 8/2009 | Lu et al. |
| 7,591,595 B2 | 9/2009 | Lu et al. |
| 7,614,797 B2 | 11/2009 | Lu et al. |
| 7,621,675 B1 | 11/2009 | Bradley |
| 7,627,222 B2 | 12/2009 | Reagan et al. |
| 7,628,545 B2 | 12/2009 | Cody et al. |
| 7,628,548 B2 | 12/2009 | Benjamin et al. |
| 7,646,958 B1 | 1/2010 | Reagan et al. |
| 7,653,282 B2 | 1/2010 | Blackwell, Jr. et al. |
| 7,654,747 B2 | 2/2010 | Theuerkorn et al. |
| 7,654,748 B2 | 2/2010 | Kuffel et al. |
| 7,658,549 B2 | 2/2010 | Elkins et al. |
| 7,661,995 B2 | 2/2010 | Nania et al. |
| 7,677,814 B2 | 3/2010 | Lu et al. |
| 7,680,388 B2 | 3/2010 | Reagan et al. |
| 7,708,476 B2 | 5/2010 | Liu |
| 7,709,733 B1 | 5/2010 | Plankell |
| 7,712,971 B2 | 5/2010 | Lee et al. |
| 7,722,262 B2 | 5/2010 | Caveney et al. |
| 7,726,998 B2 | 6/2010 | Siebens |
| 7,738,759 B2 | 6/2010 | Parikh et al. |
| 7,740,409 B2 | 6/2010 | Bolton et al. |
| 7,742,117 B2 | 6/2010 | Lee et al. |
| 7,742,670 B2 | 6/2010 | Benjamin et al. |
| 7,744,286 B2 | 6/2010 | Lu et al. |
| 7,744,288 B2 | 6/2010 | Lu et al. |
| 7,747,117 B2 | 6/2010 | Greenwood et al. |
| 7,751,666 B2 | 7/2010 | Parsons et al. |
| 7,753,596 B2 | 7/2010 | Cox |
| 7,762,726 B2 | 7/2010 | Lu et al. |
| 7,785,019 B2 | 8/2010 | Lewallen et al. |
| 7,805,044 B2 | 9/2010 | Reagan et al. |
| 7,806,599 B2 | 10/2010 | Margolin et al. |
| 7,820,090 B2 | 10/2010 | Morrow et al. |
| 7,844,158 B2 | 11/2010 | Gronvall et al. |
| 7,844,160 B2 | 11/2010 | Reagan et al. |
| 7,869,681 B2 | 1/2011 | Battey et al. |
| RE42,094 E | 2/2011 | Barnes et al. |
| 7,881,576 B2 | 2/2011 | Melton et al. |
| 7,889,961 B2 | 2/2011 | Cote et al. |
| 7,891,882 B2 | 2/2011 | Kuffel et al. |
| 7,903,923 B2 | 3/2011 | Gronvall et al. |
| 7,903,925 B2 | 3/2011 | Cooke et al. |
| 7,933,517 B2 | 4/2011 | Ye et al. |
| 7,938,670 B2 | 5/2011 | Nania et al. |
| 7,941,027 B2 | 5/2011 | Mertesdorf et al. |
| 7,959,361 B2 | 6/2011 | Lu et al. |
| 8,002,476 B2 | 8/2011 | Caveney et al. |
| 8,005,335 B2 | 8/2011 | Reagan et al. |
| 8,023,793 B2 | 9/2011 | Kowalczyk et al. |
| 8,025,445 B2 | 9/2011 | Rambow et al. |
| 8,041,178 B2 | 10/2011 | Lu et al. |
| 8,052,333 B2 | 11/2011 | Kuffel et al. |
| 8,055,167 B2 | 11/2011 | Park et al. |
| 8,083,418 B2 | 12/2011 | Fujiwara et al. |
| 8,111,966 B2 | 2/2012 | Holmberg et al. |
| 8,137,002 B2 | 3/2012 | Lu et al. |
| 8,147,147 B2 | 4/2012 | Khemakhem et al. |
| 8,157,454 B2 | 4/2012 | Ito et al. |
| 8,164,050 B2 | 4/2012 | Ford et al. |
| 8,202,008 B2 | 6/2012 | Lu et al. |
| 8,213,761 B2 | 7/2012 | Gronvall et al. |
| 8,218,935 B2 | 7/2012 | Reagan et al. |
| 8,224,145 B2 | 7/2012 | Reagan et al. |
| 8,229,263 B2 | 7/2012 | Parris et al. |
| 8,231,282 B2 | 7/2012 | Kuffel et al. |
| 8,238,706 B2 | 8/2012 | Kachmar |
| 8,238,709 B2 | 8/2012 | Solheid et al. |
| 8,249,450 B2 | 8/2012 | Conner |
| 8,256,971 B2 | 9/2012 | Caveney et al. |
| 8,267,596 B2 | 9/2012 | Theuerkorn |
| RE43,762 E | 10/2012 | Smith et al. |
| 8,301,003 B2 | 10/2012 | De et al. |
| 8,301,004 B2 | 10/2012 | Cooke et al. |
| 8,317,411 B2 | 11/2012 | Fujiwara et al. |
| 8,348,519 B2 | 1/2013 | Kuffel et al. |
| 8,363,999 B2 | 1/2013 | Mertesdorf et al. |
| 8,376,629 B2 | 2/2013 | Cline et al. |
| 8,376,632 B2 | 2/2013 | Blackburn et al. |
| 8,402,587 B2 | 3/2013 | Sugita et al. |
| 8,408,811 B2 | 4/2013 | De et al. |
| 8,414,196 B2 | 4/2013 | Lu et al. |
| 8,466,262 B2 | 6/2013 | Siadak et al. |
| 8,472,773 B2 | 6/2013 | De Jong |
| 8,480,312 B2 | 7/2013 | Smith et al. |
| 8,494,329 B2 | 7/2013 | Nhep et al. |
| 8,496,384 B2 | 7/2013 | Kuffel et al. |
| 8,506,173 B2 | 8/2013 | Lewallen et al. |
| 8,520,996 B2 | 8/2013 | Cowen et al. |
| 8,534,928 B2 | 9/2013 | Cooke et al. |

(56) References Cited

U.S. PATENT DOCUMENTS

| | | |
|---|---|---|
| 8,536,516 B2 | 9/2013 | Ford et al. |
| 8,556,522 B2 | 10/2013 | Cunningham |
| 8,573,855 B2 | 11/2013 | Nhep |
| 8,591,124 B2 | 11/2013 | Griffiths et al. |
| 8,622,627 B2 | 1/2014 | Elkins et al. |
| 8,622,634 B2 | 1/2014 | Arnold et al. |
| 8,635,733 B2 | 1/2014 | Bardzilowski |
| 8,662,760 B2 | 3/2014 | Cline et al. |
| 8,668,512 B2 | 3/2014 | Chang |
| 8,678,668 B2 | 3/2014 | Cooke et al. |
| 8,687,930 B2 | 4/2014 | McDowell et al. |
| 8,702,324 B2 | 4/2014 | Caveney et al. |
| 8,714,835 B2 | 5/2014 | Kuffel et al. |
| 8,727,638 B2 | 5/2014 | Lee et al. |
| 8,737,837 B2 | 5/2014 | Conner et al. |
| 8,755,663 B2 | 6/2014 | Makrides-Saravanos et al. |
| 8,758,046 B2 | 6/2014 | Pezzetti et al. |
| 8,770,861 B2 | 7/2014 | Smith et al. |
| 8,770,862 B2 | 7/2014 | Lu et al. |
| 8,837,894 B2 | 9/2014 | Holmberg et al. |
| 8,864,390 B2 | 10/2014 | Chen et al. |
| 8,870,469 B2 | 10/2014 | Kachmar |
| 8,879,883 B2 | 11/2014 | Parikh et al. |
| 8,882,364 B2 | 11/2014 | Busse et al. |
| 8,917,966 B2 | 12/2014 | Thompson et al. |
| 8,974,124 B2 | 3/2015 | Chang |
| 8,992,097 B2 | 3/2015 | Koreeda et al. |
| 8,998,502 B2 | 4/2015 | Benjamin et al. |
| 8,998,506 B2 | 4/2015 | Pepin et al. |
| 9,011,858 B2 | 4/2015 | Siadak et al. |
| 9,039,293 B2 | 5/2015 | Hill et al. |
| 9,075,205 B2 | 7/2015 | Pepe et al. |
| 9,146,364 B2 | 9/2015 | Chen et al. |
| 9,151,906 B2 | 10/2015 | Kobayashi et al. |
| 9,151,909 B2 | 10/2015 | Chen et al. |
| 9,158,074 B2 | 10/2015 | Anderson et al. |
| 9,158,075 B2 | 10/2015 | Benjamin et al. |
| 9,182,567 B2 | 11/2015 | Mullaney |
| 9,188,759 B2 | 11/2015 | Conner |
| 9,207,410 B2 | 12/2015 | Lee et al. |
| 9,207,421 B2 | 12/2015 | Conner |
| 9,213,150 B2 | 12/2015 | Matsui et al. |
| 9,223,106 B2 | 12/2015 | Coan et al. |
| 9,239,441 B2 | 1/2016 | Melton et al. |
| 9,268,102 B2 | 2/2016 | Daems et al. |
| 9,274,286 B2 | 3/2016 | Caveney et al. |
| 9,279,951 B2 | 3/2016 | McGranahan et al. |
| 9,285,550 B2 | 3/2016 | Nhep et al. |
| 9,297,974 B2 | 3/2016 | Valderrabano et al. |
| 9,297,976 B2 | 3/2016 | Hill et al. |
| 9,310,570 B2 | 4/2016 | Busse et al. |
| 9,316,791 B2 | 4/2016 | Durrant et al. |
| 9,322,998 B2 | 4/2016 | Miller |
| 9,360,640 B2 | 6/2016 | Ishigami et al. |
| 9,383,539 B2 | 7/2016 | Hill et al. |
| 9,400,364 B2 | 7/2016 | Hill et al. |
| 9,405,068 B2 | 8/2016 | Graham et al. |
| 9,417,403 B2 | 8/2016 | Mullaney et al. |
| 9,423,584 B2 | 8/2016 | Coan et al. |
| 9,435,969 B2 | 9/2016 | Lambourn et al. |
| 9,442,257 B2 | 9/2016 | Lu |
| 9,450,393 B2 | 9/2016 | Thompson et al. |
| 9,459,412 B2 | 10/2016 | Katoh |
| 9,482,819 B2 | 11/2016 | Li et al. |
| 9,482,829 B2 | 11/2016 | Lu et al. |
| 9,513,451 B2 | 12/2016 | Corbille et al. |
| 9,535,229 B2 | 1/2017 | Ott et al. |
| 9,541,711 B2 | 1/2017 | Raven et al. |
| 9,557,504 B2 | 1/2017 | Holmberg et al. |
| 9,684,138 B2 | 1/2017 | Lu |
| 9,581,775 B2 | 2/2017 | Kondo et al. |
| 9,588,304 B2 | 3/2017 | Durrant et al. |
| 9,612,407 B2 | 4/2017 | Kobayashi et al. |
| 9,618,704 B2 | 4/2017 | Dean et al. |
| 9,618,718 B2 | 4/2017 | Islam |
| 9,624,296 B2 | 4/2017 | Siadak et al. |
| 9,625,660 B2 | 4/2017 | Daems et al. |
| 9,638,871 B2 | 5/2017 | Bund et al. |
| 9,645,331 B1 | 5/2017 | Kim |
| 9,645,334 B2 | 5/2017 | Ishii et al. |
| 9,651,741 B2 | 5/2017 | Isenhour et al. |
| 9,664,862 B2 | 5/2017 | Lu et al. |
| 9,678,285 B2 | 6/2017 | Hill et al. |
| 9,678,293 B2 | 6/2017 | Coan et al. |
| 9,684,136 B2 | 6/2017 | Cline et al. |
| 9,696,500 B2 | 7/2017 | Barnette et al. |
| 9,711,868 B2 | 7/2017 | Scheucher |
| 9,720,193 B2 | 8/2017 | Nishimura |
| 9,733,436 B2 | 8/2017 | Van et al. |
| 9,739,951 B2 | 8/2017 | Busse et al. |
| 9,762,322 B1 | 9/2017 | Amundson |
| 9,766,416 B1 | 9/2017 | Kim |
| 9,772,457 B2 | 9/2017 | Hill et al. |
| 9,804,343 B2 | 10/2017 | Hill et al. |
| 9,810,855 B2 | 11/2017 | Cox et al. |
| 9,810,856 B2 | 11/2017 | Graham et al. |
| 9,829,658 B2 | 11/2017 | Nishimura |
| 9,829,668 B2 | 11/2017 | Coenegracht et al. |
| 9,851,522 B2 | 12/2017 | Reagan et al. |
| 9,857,540 B2 | 1/2018 | Ahmed et al. |
| 9,864,151 B2 | 1/2018 | Lu |
| 9,878,038 B2 | 1/2018 | Siadak et al. |
| 9,885,841 B2 | 2/2018 | Pepe et al. |
| 9,891,391 B2 | 2/2018 | Watanabe |
| 9,905,933 B2 | 2/2018 | Scheucher |
| 9,910,236 B2 | 3/2018 | Cooke et al. |
| 9,921,375 B2 | 3/2018 | Compton et al. |
| 9,927,580 B2 | 3/2018 | Bretz et al. |
| 9,933,582 B1 | 4/2018 | Lin |
| 9,939,591 B2 | 4/2018 | Mullaney et al. |
| 9,964,713 B2 | 5/2018 | Barnette et al. |
| 9,964,715 B2 | 5/2018 | Lu |
| 9,977,194 B2 | 5/2018 | Waldron et al. |
| 9,977,198 B2 | 5/2018 | Bund et al. |
| 9,983,374 B2 | 5/2018 | Li et al. |
| 10,007,068 B2 | 6/2018 | Hill et al. |
| 10,031,302 B2 | 7/2018 | Ji et al. |
| 10,036,859 B2 | 7/2018 | Daems et al. |
| 10,038,946 B2 | 7/2018 | Smolorz |
| 10,042,136 B2 | 8/2018 | Reagan et al. |
| 10,061,090 B2 | 8/2018 | Coenegracht |
| 10,073,224 B2 | 9/2018 | Tong et al. |
| 10,094,986 B2 | 10/2018 | Barnette et al. |
| 10,101,538 B2 | 10/2018 | Lu et al. |
| 10,107,968 B2 | 10/2018 | Tong et al. |
| 10,109,927 B2 | 10/2018 | Scheucher |
| 10,114,176 B2 | 10/2018 | Gimblet et al. |
| 10,126,508 B2 | 11/2018 | Compton et al. |
| 10,180,541 B2 | 1/2019 | Coenegracht et al. |
| 10,209,454 B2 | 2/2019 | Isenhour et al. |
| 10,215,930 B2 | 2/2019 | Mullaney et al. |
| 10,235,184 B2 | 3/2019 | Walker |
| 10,261,268 B2 | 4/2019 | Theuerkorn |
| 10,268,011 B2 | 4/2019 | Courchaine et al. |
| 10,288,820 B2 | 5/2019 | Coenegracht |
| 10,317,628 B2 | 6/2019 | Van et al. |
| 10,324,263 B2 | 6/2019 | Bund et al. |
| 10,338,323 B2 | 7/2019 | Lu et al. |
| 10,353,154 B2 | 7/2019 | Ott et al. |
| 10,353,156 B2 | 7/2019 | Hill et al. |
| 10,359,577 B2 | 7/2019 | Dannoux et al. |
| 10,371,914 B2 | 8/2019 | Coan et al. |
| 10,379,298 B2 | 8/2019 | Dannoux et al. |
| 10,386,584 B2 | 8/2019 | Rosson |
| 10,401,575 B2 | 9/2019 | Daily et al. |
| 10,401,584 B2 | 9/2019 | Coan et al. |
| 10,409,007 B2 | 9/2019 | Kadar-Kallen et al. |
| 10,422,962 B2 | 9/2019 | Coenegracht |
| 10,422,970 B2 | 9/2019 | Holmberg et al. |
| 10,429,593 B2 | 10/2019 | Baca et al. |
| 10,429,594 B2 | 10/2019 | Dannoux et al. |
| 10,434,173 B2 | 10/2019 | Siadak et al. |
| 10,439,295 B2 | 10/2019 | Scheucher |
| 10,444,442 B2 | 10/2019 | Takano et al. |

(56) References Cited

U.S. PATENT DOCUMENTS

| | | |
|---|---|---|
| 10,451,811 B2 | 10/2019 | Coenegracht et al. |
| 10,451,817 B2 | 10/2019 | Lu |
| 10,451,830 B2 | 10/2019 | Szumacher et al. |
| 10,488,597 B2 | 11/2019 | Parikh et al. |
| 10,495,822 B2 | 12/2019 | Nhep |
| 10,502,916 B2 | 12/2019 | Coan et al. |
| 10,520,683 B2 | 12/2019 | Nhep |
| 10,539,745 B2 | 1/2020 | Kamada et al. |
| 10,578,821 B2 | 3/2020 | Ott et al. |
| 10,585,246 B2 | 3/2020 | Bretz et al. |
| 10,591,678 B2 | 3/2020 | Mullaney et al. |
| 10,605,998 B2 | 3/2020 | Rosson |
| 10,606,006 B2 | 3/2020 | Hill et al. |
| 10,613,278 B2 | 4/2020 | Kempeneers et al. |
| 10,620,388 B2 | 4/2020 | Isenhour et al. |
| 10,656,347 B2 | 5/2020 | Kato |
| 10,677,998 B2 | 6/2020 | Van et al. |
| 10,680,343 B2 | 6/2020 | Scheucher |
| 10,712,516 B2 | 7/2020 | Courchaine et al. |
| 10,739,534 B2 | 8/2020 | Murray et al. |
| 10,746,939 B2 | 8/2020 | Lu et al. |
| 10,761,274 B2 | 9/2020 | Pepe et al. |
| 10,782,487 B2 | 9/2020 | Lu |
| 10,802,236 B2 | 10/2020 | Kowalczyk et al. |
| 10,830,975 B2 | 11/2020 | Vaughn et al. |
| 10,852,498 B2 | 12/2020 | Hill et al. |
| 10,852,499 B2 | 12/2020 | Cooke et al. |
| 10,859,771 B2 | 12/2020 | Nhep |
| 10,859,781 B2 | 12/2020 | Hill et al. |
| 10,962,731 B2 | 3/2021 | Coenegracht |
| 10,976,500 B2 | 4/2021 | Ott et al. |
| 11,061,191 B2 | 7/2021 | Van Baelen et al. |
| 2001/0002220 A1 | 5/2001 | Throckmorton et al. |
| 2001/0012428 A1 | 8/2001 | Nakajima et al. |
| 2002/0012502 A1 | 1/2002 | Farrar et al. |
| 2002/0064364 A1 | 5/2002 | Battey et al. |
| 2002/0076165 A1 | 6/2002 | Childers et al. |
| 2002/0079697 A1 | 6/2002 | Griffioen et al. |
| 2002/0081077 A1 | 6/2002 | Nault |
| 2002/0122634 A1 | 9/2002 | Miyake et al. |
| 2002/0131721 A1 | 9/2002 | Gaio et al. |
| 2002/0159745 A1 | 10/2002 | Howell et al. |
| 2002/0172477 A1 | 11/2002 | Quinn et al. |
| 2003/0031447 A1 | 2/2003 | Nault |
| 2003/0059181 A1 | 3/2003 | Jackman et al. |
| 2003/0063866 A1 | 4/2003 | Melton et al. |
| 2003/0080555 A1 | 5/2003 | Griffioen et al. |
| 2003/0086664 A1 | 5/2003 | Moisel et al. |
| 2003/0123813 A1 | 7/2003 | Ravasio et al. |
| 2003/0128936 A1 | 7/2003 | Fahrnbauer et al. |
| 2003/0165311 A1 | 9/2003 | Wagman et al. |
| 2003/0201117 A1 | 10/2003 | Sakabe et al. |
| 2003/0206705 A1 | 11/2003 | McAlpine et al. |
| 2003/0210875 A1 | 11/2003 | Wagner et al. |
| 2004/0057676 A1 | 3/2004 | Doss et al. |
| 2004/0057681 A1 | 3/2004 | Quinn et al. |
| 2004/0072454 A1 | 4/2004 | Nakajima et al. |
| 2004/0076377 A1 | 4/2004 | Mizukami et al. |
| 2004/0076386 A1 | 4/2004 | Nechitailo |
| 2004/0086238 A1 | 5/2004 | Finona et al. |
| 2004/0096162 A1 | 5/2004 | Kocher et al. |
| 2004/0157499 A1 | 8/2004 | Nania et al. |
| 2004/0206542 A1 | 10/2004 | Gladd et al. |
| 2004/0240808 A1 | 12/2004 | Rhoney et al. |
| 2004/0247251 A1 | 12/2004 | Rubino et al. |
| 2004/0262023 A1 | 12/2004 | Morrow et al. |
| 2005/0019031 A1 | 1/2005 | Ye et al. |
| 2005/0036744 A1 | 2/2005 | Caveney et al. |
| 2005/0036786 A1 | 2/2005 | Ramachandran et al. |
| 2005/0053342 A1 | 3/2005 | Melton et al. |
| 2005/0084215 A1 | 4/2005 | Grzegorzewska et al. |
| 2005/0105873 A1 | 5/2005 | Reagan et al. |
| 2005/0123422 A1 | 6/2005 | Lilie |
| 2005/0129379 A1 | 6/2005 | Reagan et al. |
| 2005/0163448 A1 | 7/2005 | Blackwell et al. |
| 2005/0175307 A1 | 8/2005 | Battey et al. |
| 2005/0180697 A1 | 8/2005 | De Marchi |
| 2005/0213890 A1 | 9/2005 | Barnes et al. |
| 2005/0213892 A1 | 9/2005 | Barnes et al. |
| 2005/0213899 A1 | 9/2005 | Hurley et al. |
| 2005/0213902 A1 | 9/2005 | Parsons |
| 2005/0213921 A1 | 9/2005 | Mertesdorf et al. |
| 2005/0226568 A1 | 10/2005 | Nakajima et al. |
| 2005/0232550 A1 | 10/2005 | Nakajima et al. |
| 2005/0232552 A1 | 10/2005 | Takahashi et al. |
| 2005/0232567 A1 | 10/2005 | Reagan et al. |
| 2005/0244108 A1 | 11/2005 | Billman et al. |
| 2005/0271344 A1 | 12/2005 | Grubish et al. |
| 2005/0281510 A1 | 12/2005 | Vo et al. |
| 2005/0281514 A1 | 12/2005 | Oki et al. |
| 2005/0286837 A1 | 12/2005 | Oki et al. |
| 2005/0286838 A1 | 12/2005 | Oki et al. |
| 2006/0002668 A1 | 1/2006 | Lail et al. |
| 2006/0008232 A1 | 1/2006 | Reagan et al. |
| 2006/0008233 A1 | 1/2006 | Reagan et al. |
| 2006/0008234 A1 | 1/2006 | Reagan et al. |
| 2006/0045428 A1 | 3/2006 | Theuerkorn et al. |
| 2006/0045430 A1 | 3/2006 | Theuerkorn et al. |
| 2006/0056769 A1 | 3/2006 | Khemakhem et al. |
| 2006/0056770 A1 | 3/2006 | Schmitz |
| 2006/0088247 A1 | 4/2006 | Tran et al. |
| 2006/0093278 A1 | 5/2006 | Elkins et al. |
| 2006/0093303 A1 | 5/2006 | Reagan et al. |
| 2006/0093304 A1 | 5/2006 | Battey et al. |
| 2006/0098932 A1 | 5/2006 | Battey et al. |
| 2006/0120672 A1 | 6/2006 | Cody et al. |
| 2006/0127016 A1 | 6/2006 | Baird et al. |
| 2006/0133748 A1 | 6/2006 | Seddon et al. |
| 2006/0133758 A1 | 6/2006 | Mullaney et al. |
| 2006/0133759 A1 | 6/2006 | Mullaney et al. |
| 2006/0147172 A1 | 7/2006 | Luther et al. |
| 2006/0153503 A1 | 7/2006 | Suzuki et al. |
| 2006/0153517 A1 | 7/2006 | Reagan et al. |
| 2006/0165352 A1 | 7/2006 | Caveney et al. |
| 2006/0171638 A1 | 8/2006 | Dye |
| 2006/0171640 A1 | 8/2006 | Dye |
| 2006/0210750 A1 | 9/2006 | Morrow et al. |
| 2006/0233506 A1 | 10/2006 | Noonan et al. |
| 2006/0257092 A1 | 11/2006 | Lu et al. |
| 2006/0269204 A1 | 11/2006 | Barth et al. |
| 2006/0269208 A1 | 11/2006 | Allen et al. |
| 2006/0280420 A1 | 12/2006 | Blackwell et al. |
| 2007/0031100 A1 | 2/2007 | Garcia et al. |
| 2007/0036483 A1 | 2/2007 | Shin et al. |
| 2007/0041732 A1 | 2/2007 | Oki et al. |
| 2007/0047897 A1 | 3/2007 | Cooke et al. |
| 2007/0110374 A1 | 5/2007 | Oki et al. |
| 2007/0116413 A1 | 5/2007 | Cox |
| 2007/0127872 A1 | 6/2007 | Caveney et al. |
| 2007/0140642 A1 | 6/2007 | Mertesdorf et al. |
| 2007/0160327 A1 | 7/2007 | Lewallen et al. |
| 2007/0237484 A1 | 10/2007 | Reagan et al. |
| 2007/0263961 A1 | 11/2007 | Khemakhem et al. |
| 2007/0286554 A1 | 12/2007 | Kuffel et al. |
| 2008/0019641 A1 | 1/2008 | Elkins et al. |
| 2008/0020532 A1 | 1/2008 | Monfray et al. |
| 2008/0044145 A1 | 2/2008 | Jenkins et al. |
| 2008/0069511 A1 | 3/2008 | Blackwell et al. |
| 2008/0080817 A1 | 4/2008 | Melton et al. |
| 2008/0112681 A1 | 5/2008 | Battey et al. |
| 2008/0131068 A1 | 6/2008 | Mertesdorf et al. |
| 2008/0138016 A1 | 6/2008 | Katagiyama et al. |
| 2008/0138025 A1 | 6/2008 | Reagan et al. |
| 2008/0166906 A1 | 7/2008 | Nania et al. |
| 2008/0175541 A1 | 7/2008 | Lu et al. |
| 2008/0175542 A1 | 7/2008 | Lu et al. |
| 2008/0175544 A1 | 7/2008 | Fujiwara et al. |
| 2008/0175548 A1 | 7/2008 | Knecht et al. |
| 2008/0226252 A1 | 9/2008 | Mertesdorf et al. |
| 2008/0232743 A1 | 9/2008 | Gronvall et al. |
| 2008/0260344 A1 | 10/2008 | Smith et al. |
| 2008/0260345 A1 | 10/2008 | Mertesdorf et al. |
| 2008/0264664 A1 | 10/2008 | Dinh et al. |
| 2008/0273837 A1 | 11/2008 | Margolin et al. |

(56) References Cited

U.S. PATENT DOCUMENTS

| | | |
|---|---|---|
| 2009/0003772 A1 | 1/2009 | Lu et al. |
| 2009/0034923 A1 | 2/2009 | Miller et al. |
| 2009/0041411 A1 | 2/2009 | Melton et al. |
| 2009/0060421 A1 | 3/2009 | Parikh et al. |
| 2009/0060423 A1 | 3/2009 | Melton et al. |
| 2009/0067791 A1 | 3/2009 | Greenwood et al. |
| 2009/0067849 A1 | 3/2009 | Oki et al. |
| 2009/0074363 A1 | 3/2009 | Parsons et al. |
| 2009/0074369 A1 | 3/2009 | Bolton et al. |
| 2009/0123115 A1 | 5/2009 | Gronvall et al. |
| 2009/0129729 A1 | 5/2009 | Caveney et al. |
| 2009/0148101 A1 | 6/2009 | Lu et al. |
| 2009/0148102 A1 | 6/2009 | Lu et al. |
| 2009/0148103 A1 | 6/2009 | Lu et al. |
| 2009/0148104 A1 | 6/2009 | Lu et al. |
| 2009/0148118 A1 | 6/2009 | Gronvall et al. |
| 2009/0148120 A1 | 6/2009 | Reagan et al. |
| 2009/0156041 A1 | 6/2009 | Radle |
| 2009/0162016 A1 | 6/2009 | Lu et al. |
| 2009/0185835 A1 | 7/2009 | Park et al. |
| 2009/0190895 A1 | 7/2009 | Reagan et al. |
| 2009/0238531 A1 | 9/2009 | Holmberg et al. |
| 2009/0245737 A1 | 10/2009 | Fujiwara et al. |
| 2009/0245743 A1 | 10/2009 | Cote et al. |
| 2009/0263097 A1 | 10/2009 | Solheid et al. |
| 2009/0297112 A1 | 12/2009 | Mertesdorf et al. |
| 2009/0317039 A1 | 12/2009 | Blazer et al. |
| 2009/0317045 A1 | 12/2009 | Reagan et al. |
| 2010/0008909 A1 | 1/2010 | Siadak et al. |
| 2010/0014813 A1 | 1/2010 | Ito et al. |
| 2010/0014824 A1 | 1/2010 | Lu et al. |
| 2010/0014867 A1 | 1/2010 | Ramanitra et al. |
| 2010/0015834 A1 | 1/2010 | Siebens |
| 2010/0021254 A1 | 1/2010 | Jenkins et al. |
| 2010/0034502 A1 | 2/2010 | Lu et al. |
| 2010/0040331 A1 | 2/2010 | Khemakhem et al. |
| 2010/0040338 A1 | 2/2010 | Sek |
| 2010/0061685 A1 | 3/2010 | Kowalczyk et al. |
| 2010/0074578 A1 | 3/2010 | Imaizumi et al. |
| 2010/0080516 A1 | 4/2010 | Coleman et al. |
| 2010/0086260 A1 | 4/2010 | Parikh et al. |
| 2010/0086267 A1 | 4/2010 | Cooke et al. |
| 2010/0092129 A1 | 4/2010 | Conner |
| 2010/0092133 A1 | 4/2010 | Conner |
| 2010/0092136 A1 | 4/2010 | Nhep |
| 2010/0092146 A1 | 4/2010 | Conner et al. |
| 2010/0092169 A1 | 4/2010 | Conner et al. |
| 2010/0092171 A1 | 4/2010 | Conner |
| 2010/0129034 A1 | 5/2010 | Kuffel et al. |
| 2010/0144183 A1 | 6/2010 | Nania et al. |
| 2010/0172616 A1 | 7/2010 | Lu et al. |
| 2010/0197222 A1 | 8/2010 | Scheucher |
| 2010/0215321 A1 | 8/2010 | Jenkins |
| 2010/0220962 A1 | 9/2010 | Caveney et al. |
| 2010/0226615 A1 | 9/2010 | Reagan et al. |
| 2010/0247053 A1 | 9/2010 | Cowen et al. |
| 2010/0266242 A1 | 10/2010 | Lu et al. |
| 2010/0266244 A1 | 10/2010 | Lu et al. |
| 2010/0266245 A1 | 10/2010 | Sabo |
| 2010/0272399 A1 | 10/2010 | Griffiths et al. |
| 2010/0284662 A1 | 11/2010 | Reagan et al. |
| 2010/0290741 A1 | 11/2010 | Lu et al. |
| 2010/0303426 A1 | 12/2010 | Davis |
| 2010/0303427 A1 | 12/2010 | Rambow et al. |
| 2010/0310213 A1 | 12/2010 | Lewallen et al. |
| 2010/0322563 A1 | 12/2010 | Melton et al. |
| 2010/0329625 A1 | 12/2010 | Reagan et al. |
| 2011/0019964 A1 | 1/2011 | Nhep et al. |
| 2011/0047731 A1 | 3/2011 | Sugita et al. |
| 2011/0067452 A1 | 3/2011 | Gronvall et al. |
| 2011/0108719 A1 | 5/2011 | Ford et al. |
| 2011/0116749 A1 | 5/2011 | Kuffel et al. |
| 2011/0123166 A1 | 5/2011 | Reagan et al. |
| 2011/0129186 A1 | 6/2011 | Lewallen et al. |
| 2011/0164854 A1 | 7/2011 | Desard et al. |
| 2011/0262099 A1 | 10/2011 | Castonguay et al. |
| 2011/0262100 A1 | 10/2011 | Reagan et al. |
| 2011/0299814 A1 | 12/2011 | Nakagawa |
| 2011/0305421 A1 | 12/2011 | Caveney et al. |
| 2012/0008909 A1 | 1/2012 | Mertesdorf et al. |
| 2012/0045179 A1 | 2/2012 | Theuerkorn |
| 2012/0063724 A1 | 3/2012 | Kuffel et al. |
| 2012/0063729 A1 | 3/2012 | Fujiwara et al. |
| 2012/0106912 A1 | 5/2012 | McGranahan et al. |
| 2012/0106913 A1 | 5/2012 | Makrides-Saravanos et al. |
| 2012/0134629 A1 | 5/2012 | Lu et al. |
| 2012/0183268 A1 | 7/2012 | De Montmorillon et al. |
| 2012/0213478 A1 | 8/2012 | Chen et al. |
| 2012/0251063 A1 | 10/2012 | Reagan et al. |
| 2012/0252244 A1 | 10/2012 | Elkins, II et al. |
| 2012/0275749 A1 | 11/2012 | Kuffel et al. |
| 2012/0321256 A1 | 12/2012 | Caveney et al. |
| 2013/0004122 A1 | 1/2013 | Kingsbury |
| 2013/0020480 A1 | 1/2013 | Ford et al. |
| 2013/0034333 A1 | 2/2013 | Holmberg et al. |
| 2013/0064506 A1 | 3/2013 | Eberle, Jr. et al. |
| 2013/0094821 A1 | 4/2013 | Logan |
| 2013/0109213 A1 | 5/2013 | Chang |
| 2013/0114930 A1 | 5/2013 | Smith et al. |
| 2013/0136402 A1 | 5/2013 | Kuffel et al. |
| 2013/0170834 A1 | 7/2013 | Cho et al. |
| 2013/0209099 A1 | 8/2013 | Reagan et al. |
| 2013/0236139 A1 | 9/2013 | Chen et al. |
| 2013/0266562 A1 | 10/2013 | Siadak et al. |
| 2013/0315538 A1 | 11/2013 | Kuffel et al. |
| 2014/0016902 A1* | 1/2014 | Pepe ................ G02B 6/3893 385/76 |
| 2014/0056561 A1 | 2/2014 | Lu et al. |
| 2014/0079356 A1 | 3/2014 | Pepin et al. |
| 2014/0133804 A1 | 5/2014 | Lu et al. |
| 2014/0133806 A1 | 5/2014 | Hill et al. |
| 2014/0133807 A1 | 5/2014 | Katoh |
| 2014/0133808 A1 | 5/2014 | Hill et al. |
| 2014/0153876 A1 | 6/2014 | Dendas et al. |
| 2014/0153878 A1 | 6/2014 | Mullaney |
| 2014/0161397 A1 | 6/2014 | Gallegos et al. |
| 2014/0205257 A1 | 7/2014 | Durrant et al. |
| 2014/0219609 A1 | 8/2014 | Nielson et al. |
| 2014/0219622 A1 | 8/2014 | Coan et al. |
| 2014/0233896 A1 | 8/2014 | Ishigami et al. |
| 2014/0241670 A1 | 8/2014 | Barnette et al. |
| 2014/0241671 A1 | 8/2014 | Koreeda et al. |
| 2014/0241689 A1 | 8/2014 | Bradley et al. |
| 2014/0254987 A1 | 9/2014 | Caveney et al. |
| 2014/0294395 A1 | 10/2014 | Waldron et al. |
| 2014/0314379 A1 | 10/2014 | Lu et al. |
| 2014/0328559 A1 | 11/2014 | Kobayashi et al. |
| 2014/0341511 A1 | 11/2014 | Daems et al. |
| 2014/0348467 A1 | 11/2014 | Cote et al. |
| 2014/0355936 A1 | 12/2014 | Bund et al. |
| 2015/0003787 A1 | 1/2015 | Chen et al. |
| 2015/0003788 A1 | 1/2015 | Chen et al. |
| 2015/0036982 A1 | 2/2015 | Nhep et al. |
| 2015/0153532 A1 | 6/2015 | Holmberg et al. |
| 2015/0168657 A1 | 6/2015 | Islam |
| 2015/0183869 A1 | 7/2015 | Siadak et al. |
| 2015/0185423 A1 | 7/2015 | Matsui et al. |
| 2015/0253527 A1 | 9/2015 | Hill et al. |
| 2015/0253528 A1 | 9/2015 | Corbille et al. |
| 2015/0268423 A1 | 9/2015 | Burkholder et al. |
| 2015/0268434 A1 | 9/2015 | Barnette, Jr. et al. |
| 2015/0293310 A1 | 10/2015 | Kanno |
| 2015/0316727 A1 | 11/2015 | Kondo et al. |
| 2015/0346435 A1 | 12/2015 | Kato |
| 2015/0346436 A1* | 12/2015 | Pepe ................ G02B 6/3893 385/76 |
| 2016/0015885 A1 | 1/2016 | Pananen et al. |
| 2016/0041346 A1 | 2/2016 | Barnette et al. |
| 2016/0062053 A1 | 3/2016 | Mullaney |
| 2016/0085032 A1 | 3/2016 | Lu et al. |
| 2016/0109671 A1 | 4/2016 | Coan et al. |
| 2016/0116686 A1 | 4/2016 | Durrant et al. |
| 2016/0126667 A1 | 5/2016 | Droesbeke et al. |
| 2016/0131851 A1 | 5/2016 | Theuerkorn |

(56) References Cited

U.S. PATENT DOCUMENTS

| | | |
|---|---|---|
| 2016/0131857 A1 | 5/2016 | Pimentel et al. |
| 2016/0139346 A1 | 5/2016 | Bund et al. |
| 2016/0154184 A1 | 6/2016 | Bund et al. |
| 2016/0161682 A1 | 6/2016 | Nishimura |
| 2016/0161688 A1 | 6/2016 | Nishimura |
| 2016/0161689 A1 | 6/2016 | Nishimura |
| 2016/0187590 A1 | 6/2016 | Lu |
| 2016/0202431 A1 | 7/2016 | Hill et al. |
| 2016/0209599 A1 | 7/2016 | Van Baelen et al. |
| 2016/0209602 A1 | 7/2016 | Theuerkorn |
| 2016/0238810 A1 | 8/2016 | Hubbard et al. |
| 2016/0246019 A1 | 8/2016 | Ishii et al. |
| 2016/0259133 A1 | 9/2016 | Kobayashi et al. |
| 2016/0259134 A1 | 9/2016 | Daems et al. |
| 2016/0306122 A1 | 10/2016 | Tong et al. |
| 2016/0327754 A1 | 11/2016 | Hill et al. |
| 2017/0023758 A1 | 1/2017 | Reagan et al. |
| 2017/0045699 A1 | 2/2017 | Coan et al. |
| 2017/0052325 A1 | 2/2017 | Mullaney et al. |
| 2017/0059784 A1 | 3/2017 | Gniadek et al. |
| 2017/0123163 A1 | 5/2017 | Lu et al. |
| 2017/0123165 A1 | 5/2017 | Barnette et al. |
| 2017/0131509 A1 | 5/2017 | Xiao et al. |
| 2017/0139158 A1 | 5/2017 | Coenegracht |
| 2017/0168248 A1 | 6/2017 | Hayauchi et al. |
| 2017/0168256 A1 | 6/2017 | Reagan et al. |
| 2017/0170596 A1 | 6/2017 | Goossens et al. |
| 2017/0176252 A1 | 6/2017 | Marple et al. |
| 2017/0176690 A1 | 6/2017 | Bretz et al. |
| 2017/0182160 A1 | 6/2017 | Siadak et al. |
| 2017/0219782 A1 | 8/2017 | Nishimura |
| 2017/0235067 A1 | 8/2017 | Holmberg et al. |
| 2017/0238822 A1 | 8/2017 | Young et al. |
| 2017/0254961 A1 | 9/2017 | Kamada et al. |
| 2017/0254962 A1 | 9/2017 | Mueller-Schlomka et al. |
| 2017/0261696 A1 | 9/2017 | Compton et al. |
| 2017/0261698 A1 | 9/2017 | Compton et al. |
| 2017/0261699 A1 | 9/2017 | Compton et al. |
| 2017/0285275 A1 | 10/2017 | Hill et al. |
| 2017/0288315 A1 | 10/2017 | Scheucher |
| 2017/0293091 A1 | 10/2017 | Lu et al. |
| 2017/0336587 A1 | 11/2017 | Coan et al. |
| 2017/0343741 A1 | 11/2017 | Coenegracht et al. |
| 2017/0343745 A1 | 11/2017 | Rosson |
| 2017/0351037 A1 | 12/2017 | Watanabe et al. |
| 2018/0031774 A1 | 2/2018 | Van et al. |
| 2018/0079569 A1 | 3/2018 | Simpson |
| 2018/0081127 A1 | 3/2018 | Coenegracht |
| 2018/0143386 A1 | 5/2018 | Coan et al. |
| 2018/0151960 A1 | 5/2018 | Scheucher |
| 2018/0180831 A1 | 6/2018 | Blazer et al. |
| 2018/0224610 A1 | 8/2018 | Pimentel et al. |
| 2018/0239094 A1 | 8/2018 | Barnette et al. |
| 2018/0246283 A1 | 8/2018 | Pepe et al. |
| 2018/0259721 A1 | 9/2018 | Bund et al. |
| 2018/0329149 A1 | 11/2018 | Mullaney et al. |
| 2018/0372962 A1 | 12/2018 | Isenhour et al. |
| 2019/0004251 A1 | 1/2019 | Dannoux et al. |
| 2019/0004255 A1 | 1/2019 | Dannoux et al. |
| 2019/0004256 A1 | 1/2019 | Rosson |
| 2019/0004258 A1 | 1/2019 | Dannoux et al. |
| 2019/0011641 A1 | 1/2019 | Isenhour et al. |
| 2019/0018210 A1 | 1/2019 | Coan et al. |
| 2019/0033532 A1 | 1/2019 | Gimblet et al. |
| 2019/0038743 A1 | 2/2019 | Siadak et al. |
| 2019/0041584 A1 | 2/2019 | Coenegracht et al. |
| 2019/0041585 A1 | 2/2019 | Bretz et al. |
| 2019/0041595 A1 | 2/2019 | Reagan et al. |
| 2019/0058259 A1 | 2/2019 | Scheucher |
| 2019/0107677 A1 | 4/2019 | Coenegracht et al. |
| 2019/0147202 A1 | 5/2019 | Harney |
| 2019/0162910 A1 | 5/2019 | Gurreri |
| 2019/0162914 A1 | 5/2019 | Baca et al. |
| 2019/0170961 A1 | 6/2019 | Coenegracht et al. |
| 2019/0187396 A1 | 6/2019 | Finnegan et al. |
| 2019/0235177 A1 | 8/2019 | Lu et al. |
| 2019/0250338 A1 | 8/2019 | Mullaney et al. |
| 2019/0271817 A1 | 9/2019 | Coenegracht |
| 2019/0324217 A1 | 10/2019 | Lu et al. |
| 2019/0339460 A1 | 11/2019 | Dannoux et al. |
| 2019/0339461 A1 | 11/2019 | Dannoux et al. |
| 2019/0369336 A1 | 12/2019 | Van et al. |
| 2019/0369345 A1 | 12/2019 | Reagan et al. |
| 2019/0374637 A1 | 12/2019 | Siadak et al. |
| 2020/0012051 A1 | 1/2020 | Coenegracht et al. |
| 2020/0036101 A1 | 1/2020 | Scheucher |
| 2020/0049922 A1 | 2/2020 | Rosson |
| 2020/0057205 A1 | 2/2020 | Dannoux et al. |
| 2020/0057222 A1 | 2/2020 | Dannoux et al. |
| 2020/0057223 A1 | 2/2020 | Dannoux et al. |
| 2020/0057224 A1 | 2/2020 | Dannoux et al. |
| 2020/0057723 A1 | 2/2020 | Chirca et al. |
| 2020/0096705 A1 | 3/2020 | Rosson |
| 2020/0096709 A1 | 3/2020 | Rosson |
| 2020/0096710 A1 | 3/2020 | Rosson |
| 2020/0103599 A1 | 4/2020 | Rosson |
| 2020/0103608 A1 | 4/2020 | Johnson et al. |
| 2020/0110229 A1 | 4/2020 | Dannoux et al. |
| 2020/0110234 A1 | 4/2020 | Holmberg et al. |
| 2020/0116949 A1 | 4/2020 | Rosson |
| 2020/0116952 A1 | 4/2020 | Rosson |
| 2020/0116953 A1 | 4/2020 | Rosson |
| 2020/0116954 A1 | 4/2020 | Rosson |
| 2020/0116958 A1 | 4/2020 | Dannoux et al. |
| 2020/0116962 A1 | 4/2020 | Dannoux et al. |
| 2020/0124812 A1 | 4/2020 | Dannoux et al. |
| 2020/0132939 A1 | 4/2020 | Coenegracht et al. |
| 2020/0192042 A1 | 6/2020 | Coan et al. |
| 2020/0209492 A1 | 7/2020 | Rosson |
| 2020/0218017 A1 | 7/2020 | Coenegracht |
| 2020/0225422 A1 | 7/2020 | Van et al. |
| 2020/0225424 A1 | 7/2020 | Coenegracht |
| 2020/0241211 A1 | 7/2020 | Shonkwiler et al. |
| 2020/0348476 A1 | 11/2020 | Hill et al. |
| 2020/0371306 A1 | 11/2020 | Mosier et al. |
| 2020/0393629 A1 | 12/2020 | Hill et al. |

FOREIGN PATENT DOCUMENTS

| | | |
|---|---|---|
| CN | 1071012 A | 4/1993 |
| CN | 1213783 A | 4/1999 |
| CN | 1646962 A | 7/2005 |
| CN | 1833188 A | 9/2006 |
| CN | 1922523 A | 2/2007 |
| CN | 101084461 A | 12/2007 |
| CN | 101195453 A | 6/2008 |
| CN | 201404194 Y | 2/2010 |
| CN | 101846773 A | 9/2010 |
| CN | 101939680 A | 1/2011 |
| CN | 201704194 U | 1/2011 |
| CN | 102346281 A | 2/2012 |
| CN | 203224645 U | 10/2013 |
| CN | 203396982 U | 1/2014 |
| CN | 104064903 A | 9/2014 |
| CN | 104280830 A | 1/2015 |
| EP | 0026553 A1 | 4/1981 |
| EP | 0244791 A2 | 11/1987 |
| EP | 0547788 A1 | 6/1993 |
| EP | 0782025 A1 | 7/1997 |
| EP | 0856751 A1 | 8/1998 |
| EP | 957381 A1 | 11/1999 |
| EP | 1243957 A2 | 9/2002 |
| EP | 1391762 A1 | 2/2004 |
| EP | 1431786 A2 | 6/2004 |
| EP | 1438622 A2 | 7/2004 |
| EP | 1678537 A1 | 7/2006 |
| EP | 1759231 A1 | 3/2007 |
| EP | 1810062 A1 | 7/2007 |
| EP | 2069845 A2 | 6/2009 |
| EP | 2149063 A1 | 2/2010 |
| EP | 2150847 A1 | 2/2010 |
| EP | 2193395 A1 | 6/2010 |
| EP | 2255233 A1 | 12/2010 |
| EP | 2333597 A2 | 6/2011 |

(56) References Cited

FOREIGN PATENT DOCUMENTS

| | | |
|---|---|---|
| EP | 2362253 A1 | 8/2011 |
| EP | 2401641 A1 | 1/2012 |
| EP | 2609458 A1 | 7/2013 |
| EP | 2622395 A1 | 8/2013 |
| EP | 2734879 A1 | 5/2014 |
| EP | 2815259 A1 | 12/2014 |
| EP | 2817667 A1 | 12/2014 |
| EP | 2992372 A1 | 3/2016 |
| EP | 3064973 A2 | 9/2016 |
| EP | 3101740 A1 | 12/2016 |
| EP | 3245545 A1 | 11/2017 |
| EP | 3265859 A1 | 1/2018 |
| EP | 3336992 A1 | 6/2018 |
| EP | 3362830 A1 | 8/2018 |
| EP | 3427096 A1 | 1/2019 |
| EP | 3443395 A1 | 2/2019 |
| EP | 3535614 A1 | 9/2019 |
| EP | 3537197 A1 | 9/2019 |
| EP | 3646074 A1 | 5/2020 |
| EP | 3646079 A1 | 5/2020 |
| FR | 2485754 A1 | 12/1981 |
| JP | 61-145509 A | 7/1986 |
| JP | 63089421 A | 4/1988 |
| JP | 63078908 U | 5/1988 |
| JP | 03-063615 A | 3/1991 |
| JP | 03207223 A | 9/1991 |
| JP | 05-297246 A | 11/1993 |
| JP | 06-320111 A | 11/1994 |
| JP | 07318758 A | 12/1995 |
| JP | 08292331 A | 11/1996 |
| JP | 09-135526 A | 5/1997 |
| JP | 09-325249 A | 12/1997 |
| JP | 11064682 A | 3/1999 |
| JP | 11-281861 A | 10/1999 |
| JP | 11326693 A | 11/1999 |
| JP | 2001290051 A | 10/2001 |
| JP | 2003121699 A | 4/2003 |
| JP | 2003177279 A | 6/2003 |
| JP | 2005031544 A | 2/2005 |
| JP | 2005077591 A | 3/2005 |
| JP | 2005-520987 A | 7/2005 |
| JP | 2006023502 A | 1/2006 |
| JP | 2006-259631 A | 9/2006 |
| JP | 2006337637 A | 12/2006 |
| JP | 2007078740 A | 3/2007 |
| JP | 2007121859 A | 5/2007 |
| JP | 2009265208 A | 11/2009 |
| JP | 2010152084 A | 7/2010 |
| JP | 2011033698 A | 2/2011 |
| JP | 2013156580 A | 8/2013 |
| JP | 2014085474 A | 5/2014 |
| JP | 05537852 B2 | 7/2014 |
| JP | 05538328 B2 | 7/2014 |
| JP | 2014134746 A | 7/2014 |
| JP | 3207233 U | 11/2016 |
| KR | 1020130081087 A | 7/2013 |
| WO | 01/92927 A2 | 12/2001 |
| WO | 03/36358 A2 | 5/2003 |
| WO | 2004/061509 A1 | 7/2004 |
| WO | 2005/045494 A1 | 5/2005 |
| WO | 2006/009597 A1 | 1/2006 |
| WO | 2006/052420 A1 | 5/2006 |
| WO | 2006113726 A1 | 10/2006 |
| WO | 2008/027201 A2 | 3/2008 |
| WO | 2008/150408 A1 | 12/2008 |
| WO | 2008/150423 A1 | 12/2008 |
| WO | 2009/042066 A1 | 4/2009 |
| WO | 2009/113819 A1 | 9/2009 |
| WO | 2009/117060 A1 | 9/2009 |
| WO | 2009/154990 A2 | 12/2009 |
| WO | 2010/092009 A1 | 8/2010 |
| WO | 2010/099141 A1 | 9/2010 |
| WO | 2011/044090 A2 | 4/2011 |
| WO | 2011/047111 A1 | 4/2011 |
| WO | 2012/027313 A1 | 3/2012 |
| WO | 2012037727 A1 | 3/2012 |
| WO | 2012/044741 A1 | 4/2012 |
| WO | 2012163052 A1 | 12/2012 |
| WO | 2013/016042 A1 | 1/2013 |
| WO | 2013/122752 A1 | 8/2013 |
| WO | 2013/126488 A1 | 8/2013 |
| WO | 2014151259 A1 | 9/2014 |
| WO | 2014167447 A1 | 10/2014 |
| WO | 2014/179411 A1 | 11/2014 |
| WO | 2014197894 A1 | 12/2014 |
| WO | 2015144883 A1 | 10/2015 |
| WO | 2015/197588 A1 | 12/2015 |
| WO | 2016/059320 A1 | 4/2016 |
| WO | 2016/073862 A2 | 5/2016 |
| WO | 2016095213 A1 | 6/2016 |
| WO | 2016100078 A1 | 6/2016 |
| WO | 2016/115288 A1 | 7/2016 |
| WO | 2016156610 A1 | 10/2016 |
| WO | 2016168389 A1 | 10/2016 |
| WO | 2017/063107 A1 | 4/2017 |
| WO | 2017/146722 A1 | 8/2017 |
| WO | 2017/155754 A1 | 9/2017 |
| WO | 2017/178920 A1 | 10/2017 |
| WO | 2018/083561 A1 | 5/2018 |
| WO | 2018/175123 A1 | 9/2018 |
| WO | 2018/204864 A1 | 11/2018 |
| WO | 2019005190 A2 | 1/2019 |
| WO | 2019005191 A1 | 1/2019 |
| WO | 2019005192 A1 | 1/2019 |
| WO | 2019005193 A1 | 1/2019 |
| WO | 2019005194 A1 | 1/2019 |
| WO | 2019005195 A1 | 1/2019 |
| WO | 2019005196 A1 | 1/2019 |
| WO | 2019005197 A1 | 1/2019 |
| WO | 2019005198 A1 | 1/2019 |
| WO | 2019005199 A1 | 1/2019 |
| WO | 2019005200 A1 | 1/2019 |
| WO | 2019005201 A1 | 1/2019 |
| WO | 2019005202 A1 | 1/2019 |
| WO | 2019005203 A1 | 1/2019 |
| WO | 2019005204 A1 | 1/2019 |
| WO | 2019/036339 A1 | 2/2019 |
| WO | 2019/126333 A1 | 6/2019 |
| WO | 2019/195652 A1 | 10/2019 |
| WO | 2020/101850 A1 | 5/2020 |

OTHER PUBLICATIONS

International Search Report and Written Opinion PCT/US2017/063938 dated May 14, 2018.
International Search Report and Written Opinion PCT/US2017/063953 dated May 14, 2018.
International Search Report and Written Opinion PCT/US2017/063991 dated May 14, 2018.
International Search Report and Written Opinion PCT/US2017/064027 dated Oct. 9, 2018.
International Search Report and Written Opinion PCT/US2017/064063 dated May 15, 2018.
International Search Report and Written Opinion PCT/US2017/064071 dated May 14, 2018.
International Search Report and Written Opinion PCT/US2017/064072 dated May 14, 2018.
International Search Report and Written Opinion PCT/US2017/064077 dated Feb. 26, 2018.
International Search Report and Written Opinion PCT/US2017/064084 dated Feb. 26, 2018.
International Search Report and Written Opinion PCT/US2017/064087 dated Feb. 26, 2018.
International Search Report and Written Opinion PCT/US2017/064092 dated Feb. 23, 2018.
International Search Report and Written Opinion PCT/US2017/064093 dated Feb. 26, 2018.
International Search Report and Written Opinion PCT/US2017/064095 dated Feb. 23, 2018.
International Search Report and Written Opinion PCT/US2017/064096 dated Feb. 26, 2018.

(56) References Cited

OTHER PUBLICATIONS

International Search Report and Written Opinion PCT/US2018/039019 dated Sep. 18, 2018.
International Search Report and Written Opinion PCT/US2018/039490 dated Oct. 4, 2018.
International Search Report and Written Opinion PCT/US2018/039494 dated Oct. 11, 2018.
International Search Report and Written Opinion PCT/US2018/040011 dated Oct. 5, 2018.
International Search Report and Written Opinion PCT/US2018/040104 dated Oct. 9, 2018.
International Search Report and Written Opinion PCT/US2018/040126 dated Oct. 9, 2018.
International Search Report and Written Opinion PCT/US2018/040130 dated Sep. 18, 2018.
Notice of Allowance Received for U.S. Appl. No. 16/018,997 dated Oct. 4, 2018.
Office Action Pertaining to U.S. Appl. No. 16/018,918 dated Sep. 28, 2018.
Office Action Pertaining to U.S. Appl. No. 16/018,988 dated Oct. 31, 2018.
Office Action Pertaining to U.S. Appl. No. 16/109,008 dated Oct. 31, 2018.
Faulkner et al. "Optical networks for local lopp applications," J. Lightwave Technol.0733-8724 7(11), 17411751 (1989).
Ramanitra et al. "Optical access network using a self-latching variable splitter remotely powered through an optical fiber link," Optical Engineering 46(4) p. 45007-1-9, Apr. 2007.
Ratnam et al. "Burst switching using variable optical splitter based switches with wavelength conversion," ICIIS 2017—Poeceedings Jan. 2018, pp. 1-6.
Wang et al. "Opto-VLSI-based dynamic optical splitter," Electron. Lett.0013-5194 10.1049/el:20046715 40(22), 14451446 (2004).
Xiao et al. "1xN wavelength selective adaptive optical power splitter for wavelength-division-multiplexed passive optical networks," Optics & Laser Technology 68, pp. 160-164, May 2015.
Invitation to Pay Additional Fees of the European International Searching Authority; PCT/US2019/058316; dated Feb. 14, 2020; 12 Pgs.

* cited by examiner

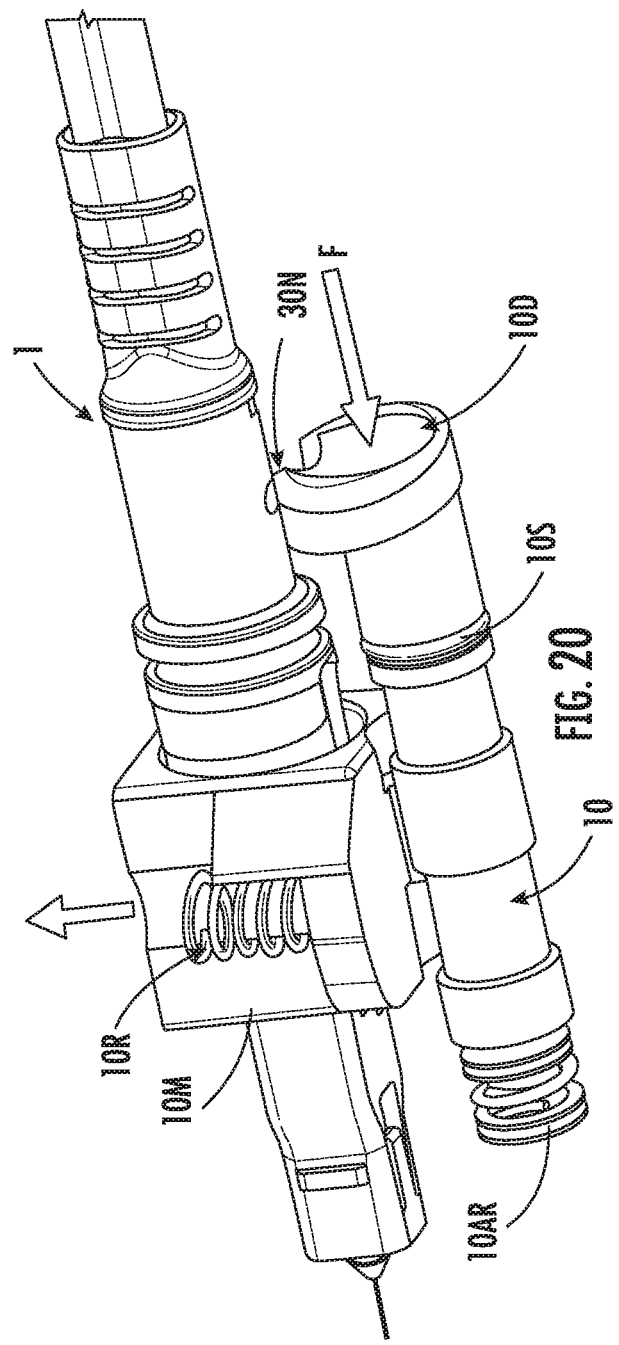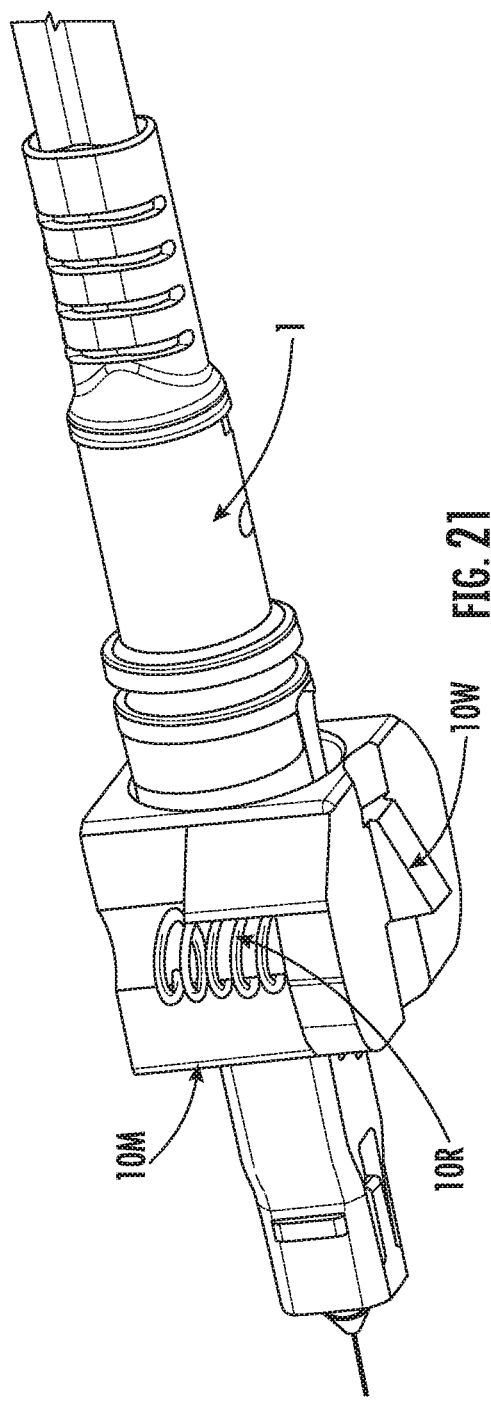

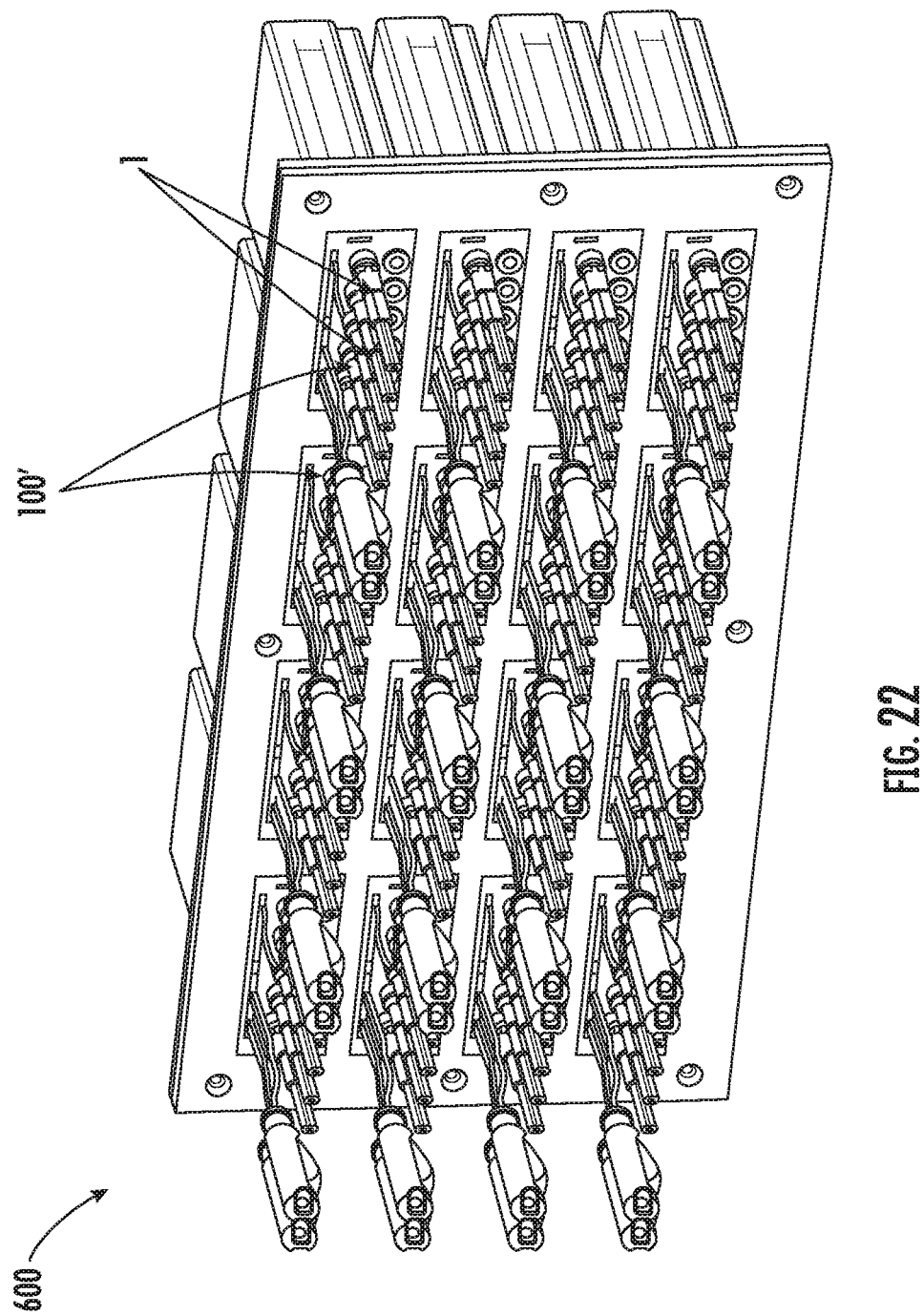

FIBER OPTIC PORT MODULE INSERTS, ASSEMBLIES AND METHODS OF MAKING THE SAME

CROSS-REFERENCE TO RELATED APPLICATIONS

This application is a continuation of International Application No. PCT/US218/040126 filed Jun. 28, 2018, which claims the benefit of priority to U.S. Application Nos. 62/526,195 filed on Jun. 28, 2017; Ser. No. 16/018,918 filed on Jun. 26, 2018; Ser. No. 16/018,988 filed on Jun. 26, 2018; and Ser. No. 16/019,008 filed Jun. 26, 2018; the content of which is relied upon and incorporated herein by reference in entirety.

This application also claims the benefit of priority under 35 USC § 365 of International Patent Application Serial Nos. PCT/US2017/064092 filed on Nov. 30, 2017; PCT/US2017/064095 filed on Nov. 30, 2017; PCT/US2018/039484 filed on Jun. 26, 2018; PCT/US2018/039485 filed on Jun. 26, 2018; and PCT/US2018/039494 filed on Jun. 26, 2018; all designating the United States of America, and the content of which is relied upon and incorporated herein by reference in its entirety.

BACKGROUND

Optical fiber is increasingly being used for a variety of applications, including but not limited to broadband voice, video, and data transmission. As bandwidth demands increase optical fiber is migrating deeper into communication networks such as in fiber to the premises applications such as FTTx, 5G and the like. As optical fiber extended deeper into communication networks the need for making robust optical connections in outdoor applications in a quick and easy manner was apparent. To address this need for making quick, reliable, and robust optical connections in communication networks hardened fiber optic connectors such as the OptiTap® plug connector were developed.

Multiports were also developed for making an optical connection with hardened connectors. Prior art multiports have a plurality of receptacles mounted through a wall of the housing for protecting an indoor connector inside the housing that makes an optical connection to the external hardened connector of the branch or drop cable. As optical networks grow and the needs continue to evolve with FTTx and 5G applications there is a further need for optical connectivity that is quick, simple and scalable.

Consequently, there exists an unresolved need for devices that allow flexibility for the network operators to quickly and easily make optical connections in optical networks while also addressing concerns related to limited space, organization, or aesthetics.

SUMMARY

The disclosure is directed to port module inserts comprising at least one connection port and a securing feature associated with the connection port. Methods of making the devices are also disclosed.

One aspect of the disclosure is directed to a port module insert comprising a housing comprising an inner housing and an outer housing along with at least one securing feature. The inner housing comprises at least one connection port having an optical connector opening extending from an outer surface of the inner housing into a cavity and defining a connection port passageway, and at least one securing feature passageway. The at least one securing feature being associated with the connection port passageway, wherein a portion of the at least one securing feature is disposed within a portion of the at leak one securing feature passageway.

Another aspect of the disclosure is directed to a port module insert comprising a housing comprising an inner housing and an outer housing along with at least one securing feature, and at least one securing feature resilient member for biasing a portion of the at least one securing feature. The inner housing comprises at least one connection port having an optical connector opening extending from an outer surface of the inner housing into a cavity and defining a connection port passageway, and at least one securing feature passageway. The at least one securing feature being associated with the connection port passageway, wherein a portion of the at least one securing feature is disposed within a portion of the at least one securing feature passageway.

Yet another aspect of the disclosure is directed to a port module insert comprising a housing comprising an inner housing and an outer housing along with at least one securing feature. The inner housing comprises at least one connection port having an optical connector opening extending from an outer surface of the inner housing into a cavity and defining a connection port passageway, and at least one securing feature passageway. The at least one securing feature being associated with the connection port passageway, wherein a portion of the at least one securing feature is disposed within a portion of the at least one securing feature passageway, and a portion of the at least one securing feature is capable of translating within a portion of the at least one securing feature passageway.

One other aspect of the disclosure is directed to a port module insert comprising a housing comprising an inner housing and an outer housing along with at least one securing feature. The inner housing comprises at least one connection port having an optical connector opening extending from an outer surface of the inner housing into a cavity and defining a connection port passageway, and at least one securing feature passageway. The at least one securing feature being associated with the connection port passageway, wherein a portion of the at least one securing feature is disposed within a portion of the at least one securing feature passageway, and the at least one securing feature comprises a bore, where and a portion of the at least one securing feature is capable of translating within a portion of the at least one securing feature passageway.

A further aspect of the disclosure is directed to a port module insert comprising a housing comprising an inner housing and an outer housing along with at least one securing feature. The inner housing comprises at least one connection port having an optical connector opening extending from an outer surface of the inner housing into a cavity and defining a connection port passageway, and at least one securing feature passageway. The at least one securing feature being associated with the connection port passageway, wherein a portion of the at least one securing feature is disposed within a portion of the at least one securing feature passageway, and the at least one securing feature comprises a bore, where a portion of the at least one securing feature is capable of translating within a portion of the at least one securing feature passageway. The at least one securing feature translates from a retain position to an open position as a suitable fiber optic connector is inserted into the at least one connection port.

Yet another aspect of the disclosure is directed to a port module insert comprising a housing comprising an inner housing and an outer housing along with at least one securing feature. The inner housing comprises at least one connection port having an optical connector opening extending from an outer surface of the inner housing into a cavity and defining a connection port passageway, and at least one securing feature passageway. The at least one securing feature being associated with the connection port passageway, and the at least one securing feature comprises a bore and a locking feature, where a portion of the at least one securing feature translates from a retain position to an open position as a suitable fiber optic connector is inserted into the at least one connection port.

A still further aspect of the disclosure is directed to a port module insert comprising a housing comprising an inner housing and an outer housing along with at least one securing feature. The inner housing comprises at least one connection port having an optical connector opening extending from an outer surface of the inner housing into a cavity and defining a connection port passageway, and at least one securing feature passageway. The at least one securing feature being associated with the connection port passageway, wherein a portion of the at least one securing feature is disposed within a portion of the at leak one securing feature passageway, and the at least one securing feature comprises a securing member and an actuator, and the at least one securing member is capable of translating within a portion of the cavity. The securing member translates from a retain position to an open position as a suitable fiber optic connector is inserted into the at least one connection port.

The disclosure also discloses methods of making port module inserts. One method of making a port module insert comprises of the steps of providing a housing having an inner housing and an outer housing along with at least one securing feature. The inner housing comprises at least one connection port having an optical connector opening extending from an outer surface of the inner housing into a cavity and defining a connection port passageway, and at least one securing feature passageway. The method includes assembling at least one securing feature being so it is associated with the connection port passageway, wherein a portion of the at least one securing feature is disposed within a portion of the at least one securing feature passageway. Other methods for making port module inserts as disclosed herein are also contemplated.

Another method of making a port module insert comprises the steps of providing a housing having an inner housing and an outer housing along with at least one securing feature. The inner housing comprises at least one connection port having an optical connector opening extending from an outer surface of the inner housing into a cavity and defining a connection port passageway, and at least one securing feature passageway. The method includes assembling at least one securing feature being so it is associated with the connection port passageway, wherein a portion of the at least one securing feature is disposed within a portion of the at least one securing feature passageway. The method also includes assembling at least one securing feature resilient member for biasing a portion of the at least one securing feature.

The devices can have any suitable construction such as disclosed herein such a connection port that is keyed for inhibiting a non-compliant connector from being inserted and potentially causing damage to the device.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

BRIEF DESCRIPTION OF THE FIGURES

FIGS. 20 and 21 are perspective views showing details of the construction of the port module insert of FIG. 5 with an external connector attached;

FIG. 22 is a perspective view of showing another device in rack using explanatory port module insert according to the concepts disclosed;

DETAILED DESCRIPTION

Figure 1:
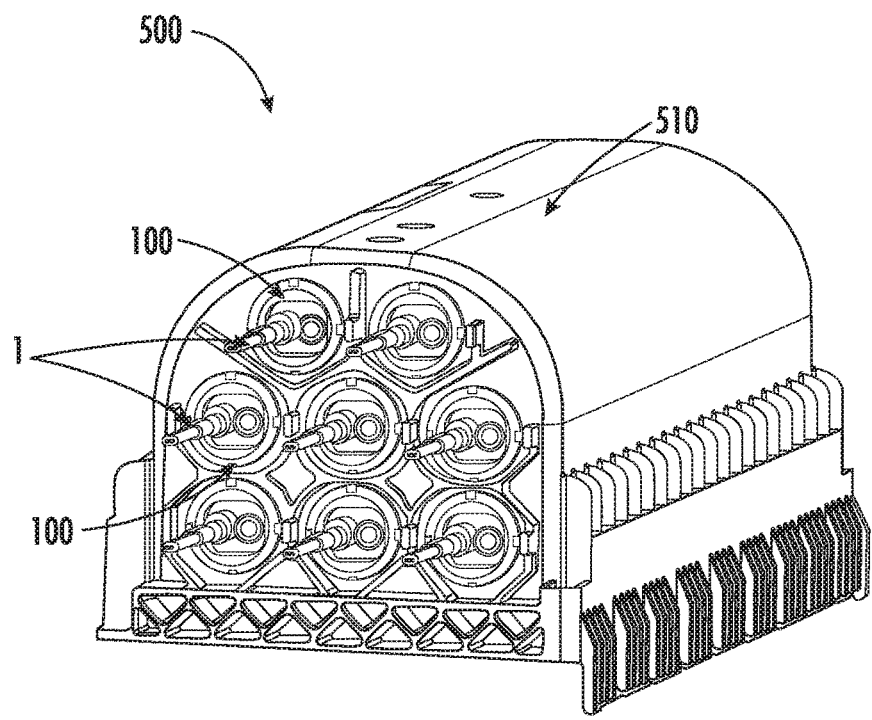
FIGS. 1 and 2 are perspective views of a plurality of fiber optic port module inserts according to the concepts disclosed installed into a closure.

Reference will now be made in detail to the embodiments of the disclosure, examples of which are illustrated in the accompanying drawings. Whenever possible, like reference numbers will be used to refer to like components or parts.

The concepts for the devices disclosed herein are suitable for providing at least one optical connection for indoor, outdoor or other environments as desired. Generally speaking, the devices disclosed and explained in the exemplary embodiments are fiber optic port module inserts (hereinafter "port module insert"), but the concepts disclosed may be used with any suitable device as appropriate. As used herein, the term "port module insert" means any device comprising a first connection port for receiving a fiber optic connector and making an optical connection configured as a modular assembly. Consequently, the port module insert that can be mounted into the opening of a suitable device as a module for making optical connections to the device. In one embodiment, the port module insert has a first connection port for receiving and securing an external fiber optic connector, and the first connection port is aligned with an adapter for making an optical connection between external fiber optic connector and a connector received in the adapter. Thus, the port module insert may be used in a variety of devices such as mounted to an external wall of the device for providing modular assembly of devices with different port counts, thereby providing further flexibility to the network provider. The port module insert comprises a securing feature associated with the at least one connection port for securing and releasing the external fiber optic connector.

The concepts disclosed advantageously allow compact form-factors for the port module inserts. The securing features disclosed herein for the port module insert engage directly with a portion of connector without conventional structures like prior art devices that require the turning of a coupling nut, bayonet or the like. As used herein, "securing feature" excludes threads and features that cooperate with bayonets on a connector. Thus, the devices disclosed may allow connection port to be closely spaced and may result in small devices since the room and structure needed for turning a threaded coupling nut or bayonet is not necessary. The compact form-factors may allow the placement of the port module insert into a variety of devices in in indoor, outdoor, buried, aerial, industrial or other applications while advantageously providing a device having at least one connection port with a robust and reliable optical connection in a removable and replaceable manner.

The port module inserts disclosed are simple and elegant in their designs. The devices disclosed comprise at least one connection port and a securing feature associated with the connection port that is suitable for retaining an external fiber optic connector received by the connection port. A keying portion of the connection port may cooperates with a key on a complimentary external fiber optic connector to inhibit damage to the connection port by inhibiting the insertion of a non-compliant connector while also ensuring the correct rotational alignment to secure the fiber optic connector. The keying portion may also aid the user during blind insertion of the connector into the connection port of the device to determine the correct rotational orientation with respect to the connection port when a line of sight is not possible or practical for alignment. The keying portion may be an additive keying portion to the primitive geometric round shape of the connection port passageway such as a male key. However, the concepts for the connection ports of devices may be modified for different connector designs without a keying portion as well.

The concepts disclosed advantageously allow the quick and easy connection and retention by inserting the fiber optic connectors directly into the connection port of the port module insert without the need or space considerations for turning a threaded coupling nut or bayonet for retaining the external fiber optic connector, Generally speaking, the securing features disclosed for use with port module inserts herein may comprise one or more components with at least one component translating for releasing or securing the external fiber optic connector to the device. As used herein, the term "securing feature" excludes threaded portions or features for securing a bayonet disposed on a connector.

Since the connector footprint used with the devices disclosed does not require the bulkiness of a coupling nut or bayonet, the fiber optic connectors used with the devices disclosed herein may also be significantly smaller than conventional fiber optic connectors.

The devices disclosed comprise a securing feature for directly engaging with a suitable portion of a connector housing of the external fiber optic connector or the like for securing an optical connection with the device. Different variations of the concepts are discussed in further detail below. The structure for securing the fiber optic connectors in the port module insert provides a quick-connect feature. The concepts disclosed advantageously allow a scalable and relatively dense and organized array of connection ports in a relatively small form-factor while still being rugged for demanding environments.

The concepts disclosed herein are suitable for optical distribution networks such as for Fiber-to-the-Home or 5G applications, but are equally applicable to other optical applications as well including indoor, automotive, industrial, wireless, or other suitable applications. Additionally, the concepts disclosed may be used with any suitable fiber optic connector footprint that cooperates with the securing feature of the port module insert. Various designs, constructions, or features for devices are disclosed in more detail as discussed herein and may be modified or varied as desired.

Figure 2:
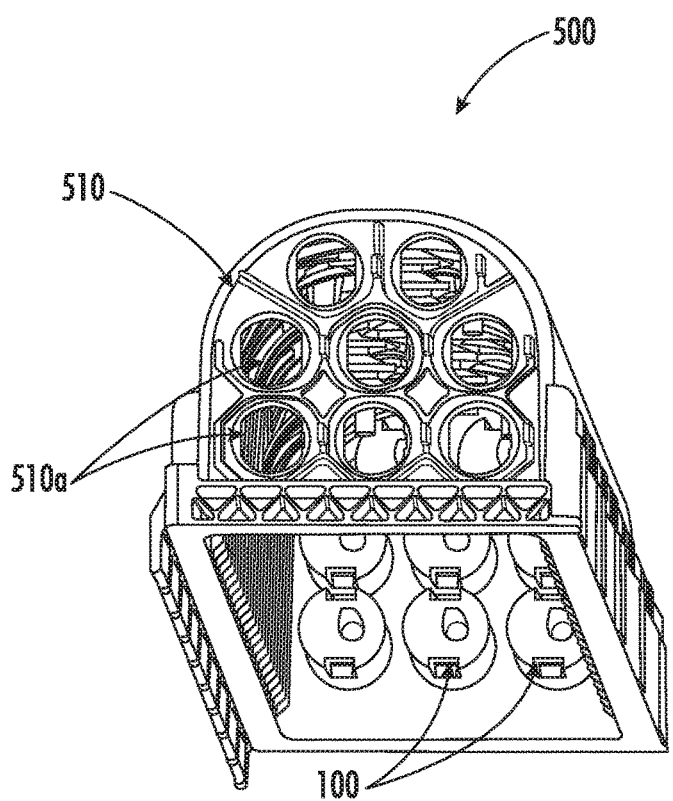
Figure 3:
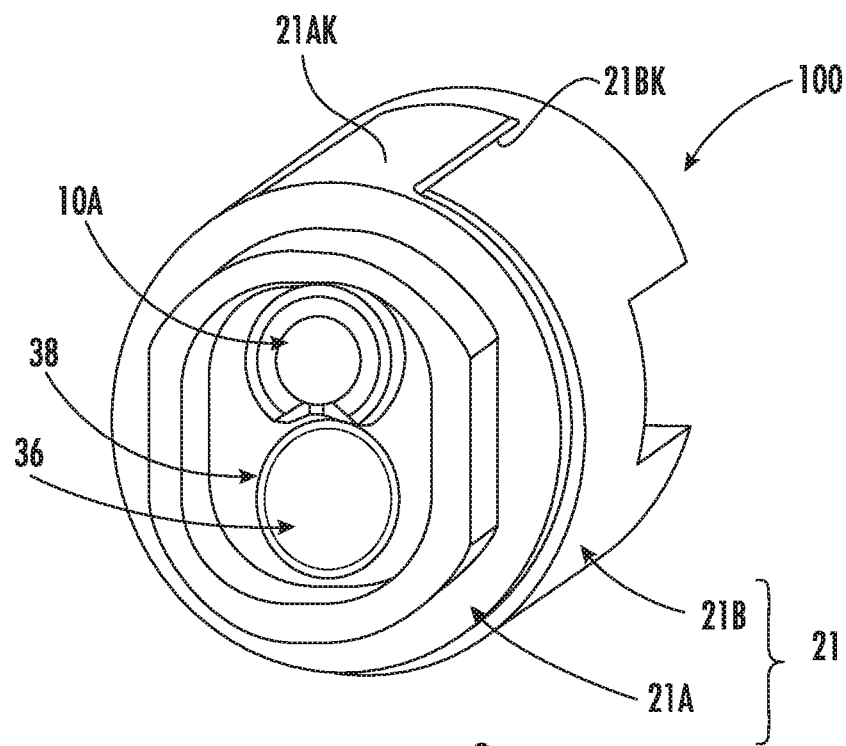
FIG. 3 is a perspective view of the port module insert of FIGS. 1 and 2 removed from the closure.
Figure 4:
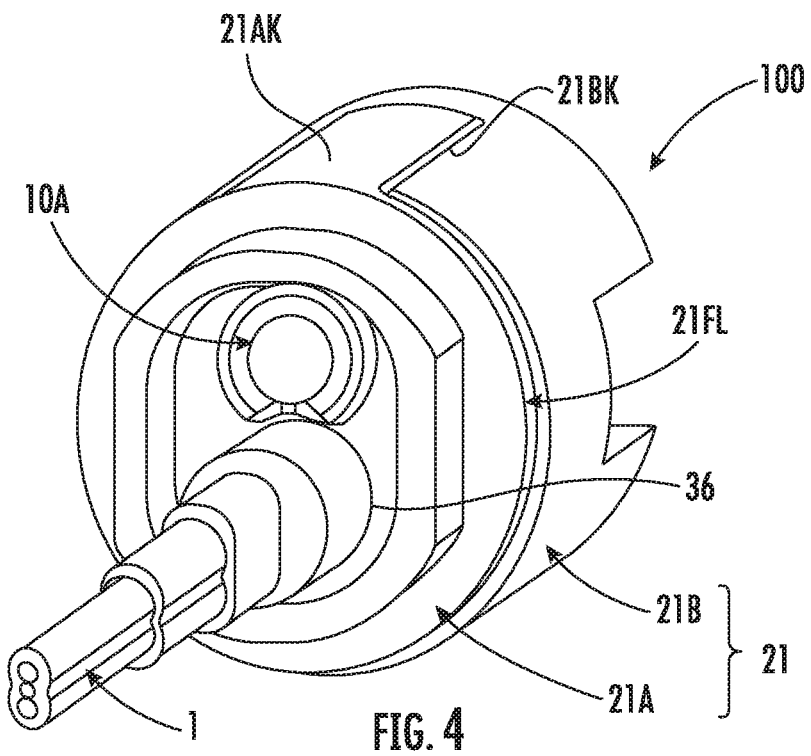
FIG. 4 is a perspective view of the port module insert of FIG. 3 with an external fiber optic connector inserted and secured in the connection port for making an optical connection.

FIGS. 1 and 2 are perspective views of an explanatory closure 500 comprising a plurality of port module inserts 100 according to the concepts disclosed. Port module inserts 100 are attached to a wall of a shell 510 of closure 500 as shown for making optical connections with fiber optic connectors disposed inside the closure. FIG. 2 shows the shell 510 of closure 500 comprising a plurality of openings 510a sized and shaped for receiving and securing a port module insert 100 at the external wall such as shown in FIG. 1. Of course, other devices may have one or more openings for receiving port module insert such as multiports (FIG. 23) and the like. Further, the openings need not be round, but can have any suitable shape to conform with the form-factor of the port module insert such as shown in FIG. 22, FIG. 3 is a perspective view of the port module insert 100 removed from the closure, and FIG. 4 is a perspective view of the port module insert 100 of FIG. 3 with an external fiber optic cable assembly having a connector 1 inserted and secured in the connection port 36 for making an optical connection. Housing 21 comprises an inner housing 21A, and an outer housing 21B. Generally speaking, port module insert 100 comprises at least one connection port 36 being a portion of a housing 21. By way of explanation, at least one connection port 36 is molded as a portion of housing 21.

More specifically, the inner housing 21A comprises at least one connection port 36 having an optical connector opening 38 extending from an outer surface 34 of the inner housing 21A into a cavity 16 and defining a connection port passageway 33. The inner housing 21A also comprises at least one securing feature passageway 45. In this embodiment, the port module insert 100 comprises a securing feature 10 comprising an actuator 10A and a securing member 10M. The actuator 10A is used for releasing the external fiber optic connector from the connection port 36 as discussed herein.

Figure 5:
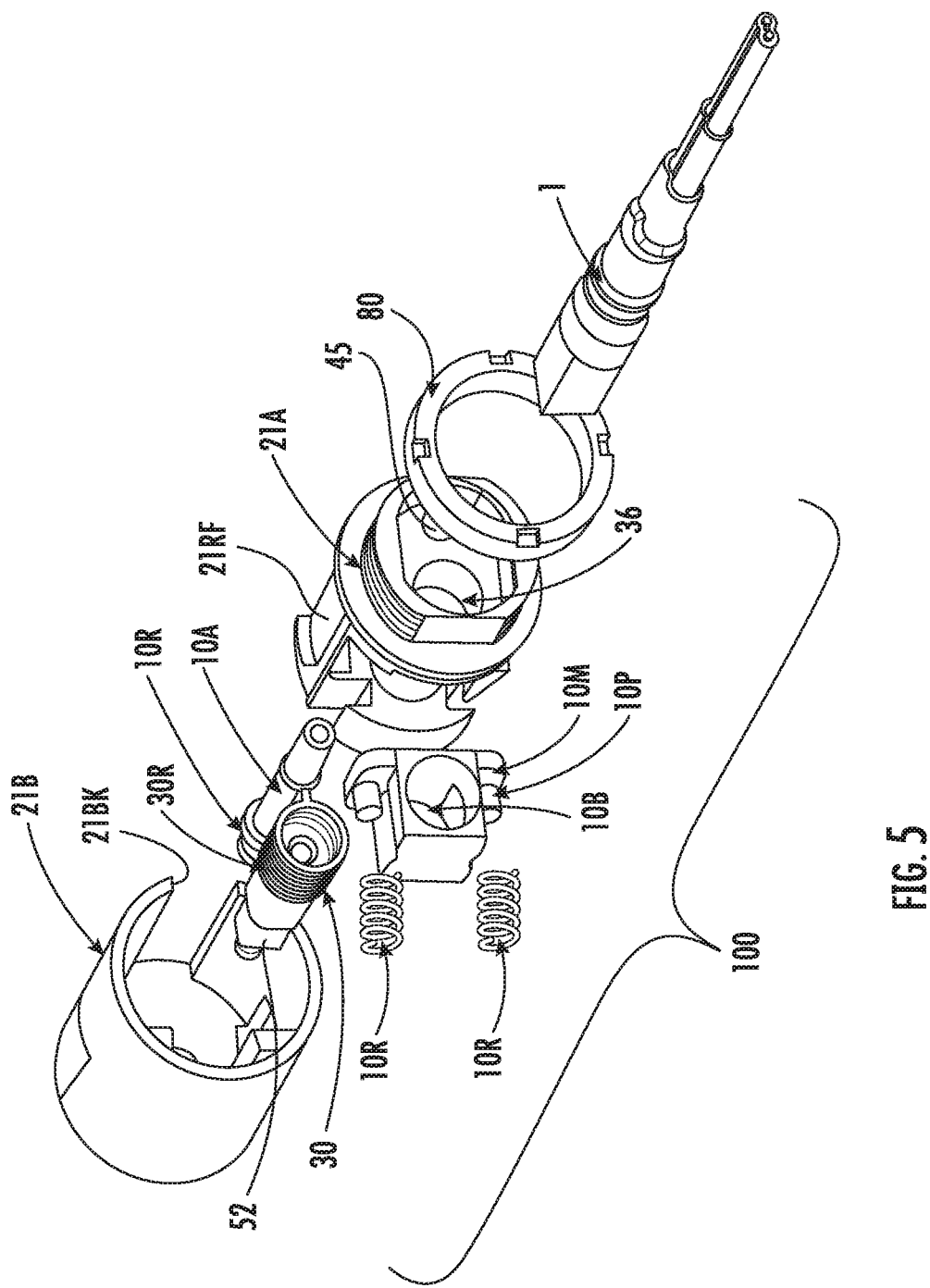
FIG. 5 is a partially exploded view of the port module insert of FIGS. 3 and 4.

FIG. 5 is an exploded view of explanatory port module insert 100 comprising at least one connection port 36 for making optical connections. Port module insert 100 comprises at least one securing feature 10, a housing 21 comprising an inner housing 21A and an outer housing 21B, an adapter 30, and a resilient member 30R for biasing the adapter 30. Securing feature 10 comprises actuator 10A and securing member 10M that cooperate for retaining or releasing external fiber optic connectors. Securing member 10M may be biased to a normally retain position using one or more resilient members 10R, and the actuator 10A may be biased to a forward-position using resilient member 10AR. Although, cable assemblies with single-fiber connectors are shown, the concepts may be used with multi-fiber connectors as well. Port module insert 100 may also include a coupling nut 80 or other retaining structure for mounting the port module insert 100 to an external wall using the threads 21T on inner housing 21A.

The securing feature 10 is associated with the connection port passageway 33 for cooperating with the external fiber optic connector 10. A portion of the securing feature 10 may translate for releasing or securing the external fiber optic connector 10. One or more securing feature passageways 45 may extend from the outer surface 34 of port module insert 100. Respective securing features 10 are associated with the connection port passageways 33 and may have a portion of the securing feature 10 disposed within a portion of the securing feature passageway 45 of the port module insert 100.

Optical connections to the port module inserts 100 are made by inserting one or more suitable external fiber optic connectors 1 into the connection port passageway 33 of the connection port 36 as desired. Specifically, the connection port passageway 33 is configured for receiving a suitable external fiber optic connector 1 (hereinafter connector) of a fiber optic cable assembly (hereinafter cable assembly). Each connection port passageway 33 or connection port 36 is associated with a securing feature 10 for retaining (e.g., securing) connector 10 in the port module insert 100. The securing feature 10 advantageously allows the user to make a quick and easy optical connection at the connection port 36 of port module inserts 100 by pushing the connector 1 into the connection port 36 until it is secured. The securing feature 10 may operate for providing a connector release feature when actuated such as by pushing inward.

Specifically, the external connector 1 may be retained within the respective connection port 36 of the device by pushing and fully-seating the connector 1 within the connection port 236 as shown in FIG. 4. To release the connector 1 from the respective connection port 36, the securing feature 10 is actuated by pushing the actuator 10A inward to translate the securing member 10M a suitable distance, thereby releasing the securing member 10M from the connector and allowing connector 1 to be removed from the connection port 36. Stated another way, the at least one securing feature 10 is capable of releasing the connector 10 when translating the actuator 10A a suitable distance within the securing feature passageway 45. The full insertion and automatic retention of the connector 1 may advantageously allow one-handed installation of the connector 1 by merely pushing the connector into the connection port 36. The port module inserts 100 disclosed accomplish this connector retention feature upon full-insertion by biasing the securing member 10M to a retain position in the normal position. However, other modes of operation for retaining and releasing the connector 1 are possible according to the concepts disclosed. For instance, the securing feature 10 may be designed to require actuation for inserting the connector 1; however, this may require a two-handed operation.

Securing feature 10 may be designed for holding a minimum pull-out force for connector 1. In some embodiments, the pull-out force may be selected to release the connector 1 before damage is done to the device or the connector 1. By way of example, the securing feature 10 associated with the connection port 36 may require a pull-out force of about 50 pounds (about 220N) before the connector 1 would release likewise, the securing feature 10 may provide a side pull-out force for connector 1 for inhibiting damage as well. By way of example, the securing feature 10 associated with the connection port 36 may provide a side pull-out force of about 25 pounds (about 110N) before the connector 1 would release. Of course, other pull-out forces such as 75 pounds (about 330N) or 100 (about 440N) pounds are possible along with other side pull-out forces.

Figure 6:
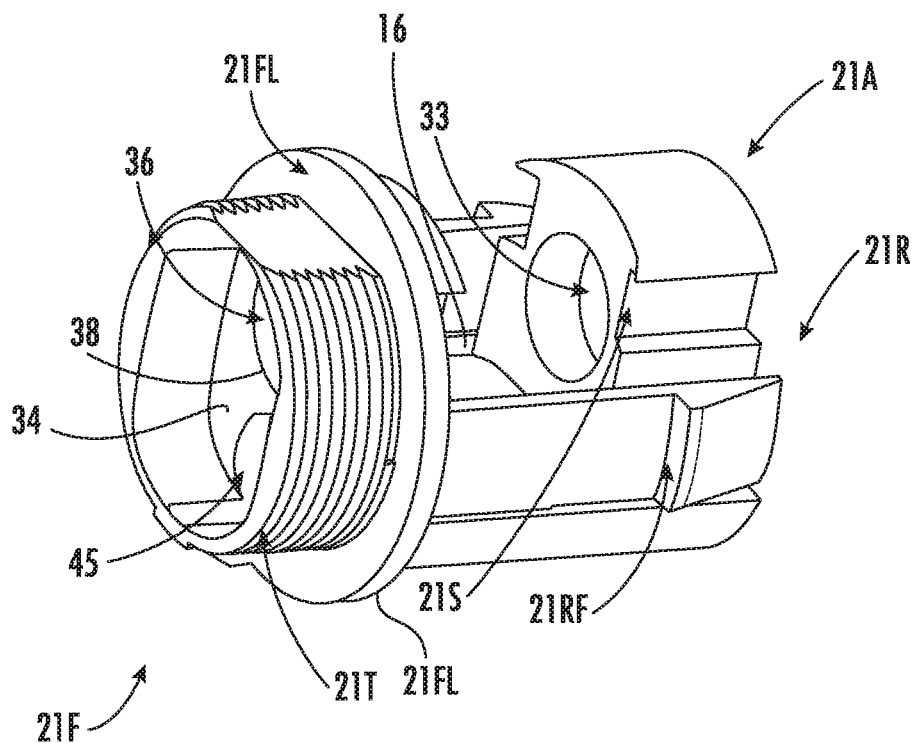
FIGS. 6 and 7 depict perspective views of the inner housing of the port module insert of FIG. 5.
Figure 7:
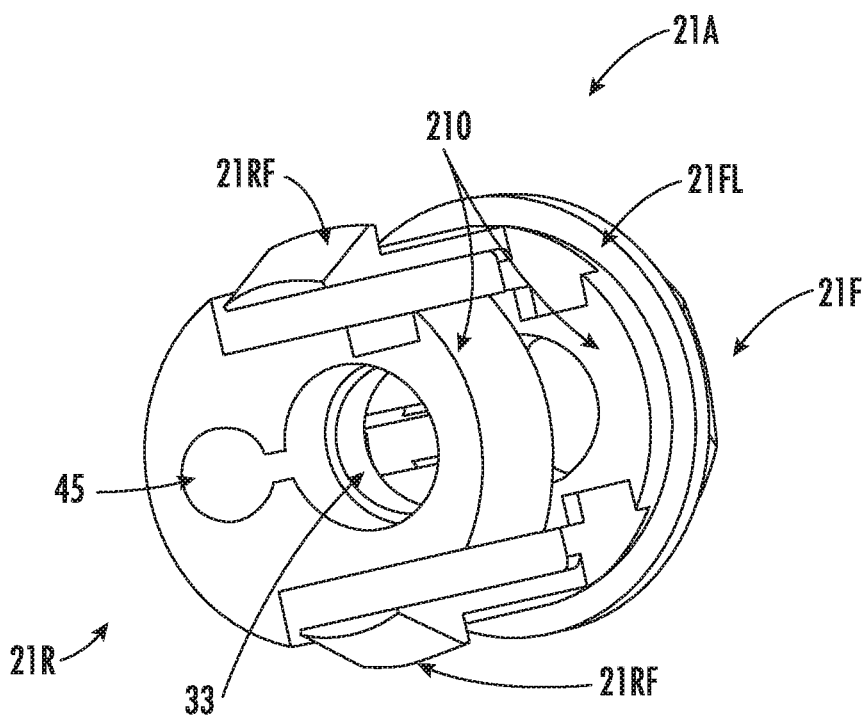

FIGS. 6 and 7 depict perspective views of the inner housing 21A of the port module insert 100 of FIG. 5 for showing details of the same. Inner housing 21A comprises at least one connection port 36 having an optical connector opening 38 extending from an outer surface 34 at a front end 21F into a cavity 16 defining a connection port passageway 33. As depicted, the connection port passageway 33 extends from the front end 21F to the rear end 21R of the inner housing 21A. Inner housing 21A also comprises at least one securing feature passageway 45. Securing feature passageway 45 receives a portion of the securing feature 10. More specifically, securing feature passageway 45 receives a portion of the securing member 10A that may translate within the securing feature passageway 45.

Cavity 16 is sized for receiving a portion of the securing feature 10M. Securing feature is biased relative to the inner housing 21A to the retain position for securing the external connector 1 as discussed herein. Securing feature 10M comprises a bore 10B that is aligned with the connection port 36, and the bore 10B is sized and shaped to receive a portion of the external connector 1 therethrough and secure and release the same such as shown in FIGS. 20 and 21.

Inner housing 21A may comprise one or more retention features 21RF for assembling and securing the inner housing 21A with the outer housing 21B. In this embodiment, retention features 21RF are a first and second cantilevered latch arms that extend from a flange 21FL of the inner housing 21a toward the rear end 21R. Retention features 21A are configured to cooperate with complementary retention features on the outer housing 21B. In this embodiment, the latch arms cooperate with the windows 21W on the outer housing 21B for securing the inner housing 21A with the outer housing 21B. Additionally, inner housing 21A comprises slots 21S disposed at near the front and rear ends 21F, 21R for aligning the inner housing 21A in the correct orientation for assembly with the outer housing 21B. Specifically, the slots 21S align and cooperate with one or more complimentary rails 21BRL (FIGS. 15 and 16) on the outer housing 21B.

Inner housing 21A may also comprise a threaded portion 21T for securing a coupling nut 80 and securing the port module insert to wall of a device. Specifically, the wall of the device is captured between the flange 21FL and the coupling nut 80 when mounted.

Figure 8:
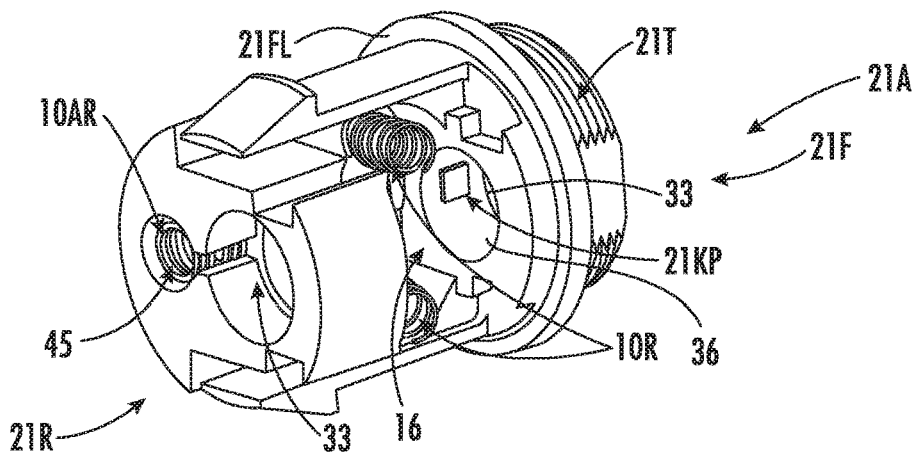
FIGS. 8-10 are various views of the inner housing of the port module insert of FIG. 5 with resilient members shown.
Figure 9:
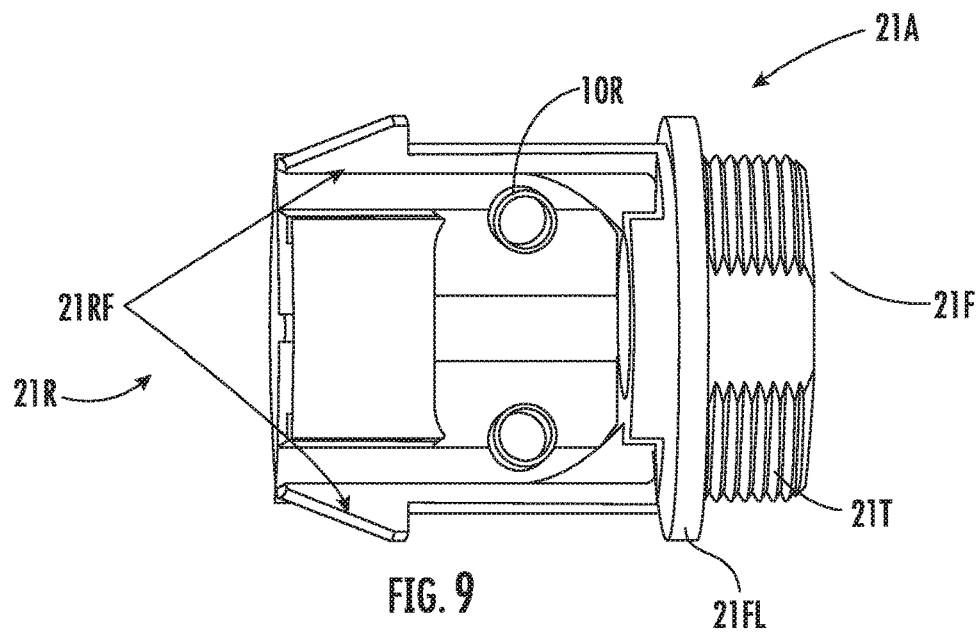
Figure 10:
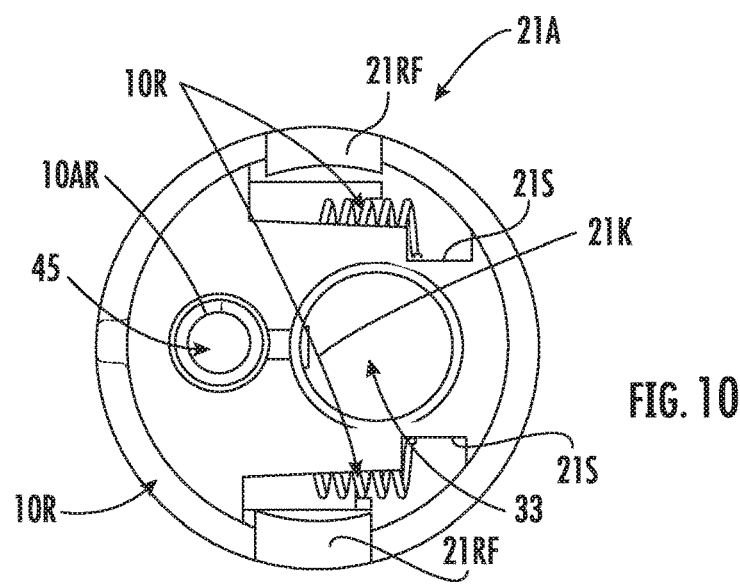

FIGS. 8-10 depict further views of the inner housing 21A of the port module insert 100 of FIG. 5 with resilient members shown in position on the inner housing 21A for illustrating the biasing direction of the securing member 10M. As shown, one or more securing feature resilient members 10R are disposed in cavity 16 and are seated into recesses disposed in the cavity 16 of inner housing 21A as best shown in FIG. 9. Securing feature resilient members 10R bias the securing member 10M to normally retained position for the securing member 10M for retaining the external connector 1 in connection port 36 during use. FIGS. 8 and 10 also show an actuator resilient member 10AR disposed within the securing feature passageway 45. Specifically, actuator resilient member 10AR is disposed in the securing feature passageway 45 from the front end 21F of the inner housing 21A for trapping the actuator resilient member 10AR within the securing feature passageway 45. Actuator resilient member 10AR is used for biasing the actuator 10A to a forward position and allows the actuator 10A to translate within the securing feature passageway 45.

As best depicted in FIG. 8, connection port passageway 33 may comprise a keying portion 21KP as part of the inner housing 21A. As shown, keying portion 21KP is disposed forward of the securing feature 10 (i.e., before) in the connection port passageway 33 upon entry of the passageway. The keying portion 21KP may have any suitable location in the connection port passageway 33 forward of the securing feature. Keying portion 21KP inhibits the insertion of a non-compliant connector into connection port 236, thereby inhibiting damage that may be caused to the device. Suitable connectors 1 may have a complimentary keying feature that cooperates with the keying portion 21KP of port module insert 100. Keying portion 21KP may be a protrusion or additive feature disposed within the connection port passageway 33 on the optical connector opening 38 side of the securing feature 10 and may take several different configuration if used. For instance, keying portion 21KP may be a simple protrusion as shown. In other embodiments, the keying portion 21KP may take the shape of a D-shaped opening to allow only a suitable connector 1 having a complimentary feature to be inserted into the connection port 36. The keying portion 21KP may also aid with blind mating a connector 1 into the connection port 36 since it only allows further insertion into the connection port 36 when the connector is in the proper rotational orientation.

As best depicted in FIG. 9, the shape of the cavity 16 formed in the inner housing 21A may key the assembly of the securing member 10M (FIG. 12) into the inner housing 21A so that the securing member 10M may only be assembled into the cavity 16 in one orientation for the correct orientation of the locking feature 10L in the passageway 33 for the port module insert 100.

Securing feature 10 comprises a securing member 10M capable of translating in a transverse direction with respect to the connection port 36. On the other hand, actuator 10A has a portion that is capable of translating within securing feature passageway 45 that is generally aligned with the connection port 36. The cooperation of the actuator 10A and the securing member 10M allow the movement of the actuator 10A in the direction aligned with the connection port 36 to be transformed into movement of the securing member 10M in a direction that is transverse to the connection port 36. However, the securing features 10 disclosed herein may take many different constructions or configurations.

Figure 11:
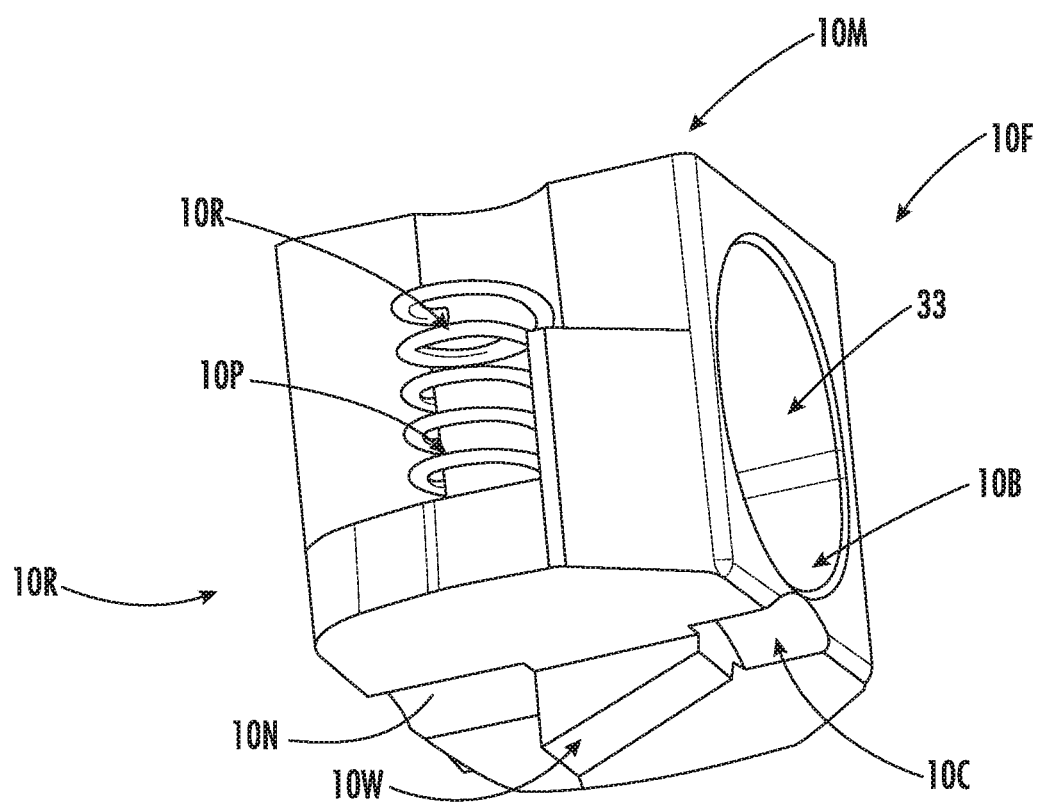
FIG. 11 is a perspective view of a portion of the securing feature of the port module insert of FIG. 5 with the biasing resilient members shown.

The transformation of the direction of movement in the securing feature 10 is enabled by a wedge 10W disposed on the securing member 10M as shown in FIG. 11. Simply stated, as the actuator 10A is pushed forward the wedge 10W of the securing member 10M follows a complimentary surface of actuator 10A for translating the securing member 10M to an open position for connector release. When the displacing force is removed from the actuator 10A, then the actuator resilient member 10AR biases the actuator 10A to its home position, and securing member 10M can return to its normally retain position for securing external connector 1 since the actuator 10A is not applying a displacing force to the securing member 10M.

FIGS. 11-44 show detailed views of the securing member 10M. As shown in FIG. 11, securing member 10M comprises one or more posts 10P for positioning of the securing feature resilient members 10R when assembled. In this embodiment, two securing feature resilient members 10R are used on opposite sides of bore 10B for balancing the restoring force on the securing member 10M so that it translates in a smooth manner and other concepts are possible. Securing member 10M locates wedge 10W disposed on the side opposite of the posts 10P. When assembled the posts 10P face the cavity 16 of the inner housing 21A and the wedge 10W faces outward so that it can cooperate with the actuator 10A as depicted in FIG. 19. Securing member may also comprise one or more notches 10N or cutouts 10C, thereby allowing the nesting of the actuator 10A in close-position with the securing member for providing a compact form-factor.

In this embodiment, the securing feature 10 comprises a bore 10B that is aligned with the least one connection port passageway 33 when assembled. Bore 10B is sized for receiving a suitable connector 10 therethrough for securing the same for optical connectivity. Bores or openings through the securing feature 10 may have any suitable shape or geometry for cooperating with its respective connector. For instance, the bore may have any suitable shape desired including locking features on the surface of the bore for engaging with a connector for securing the same.

Securing feature 10 comprises a locking feature 10L. Locking feature 10L is disposed on securing member 10M and cooperates with a portion of the connector 1 when it is fully-inserted into the connection port 36 for securing the same. Specifically, the connector housing of connector 1 may have a cooperating geometry that engages the locking feature 10L. FIG. 11 shows a detailed view of securing member 10M comprising a bore 10B that is aligned with the connector port passageway 33 when assembled. The bore 10B is sized for receiving a portion of connector 10 therethrough.

In this embodiment, locking feature 10L is disposed within bore 10B. Specifically, locking feature 10L comprises a ramp in this embodiment. The ramp is integrally formed at a portion of the bore 10B with the ramp angling up when looking into the connection port 36. The ramp allows the connector 1 to push and translate the securing member 10M downward against the securing feature resilient member 10R as the connector 1 is inserted in the connection port 36. Ramp may have any suitable geometry such as a retention surface such as a ledge at the backside or the ramp may lead to a flat portion before the retention surface. Once the locking feature 10L of the securing feature 10 is aligned with the cooperating geometry of the of connector 1, then the securing feature 10 translates so that the locking feature 10L engages complementary feature of connector 1.

Figure 11A:
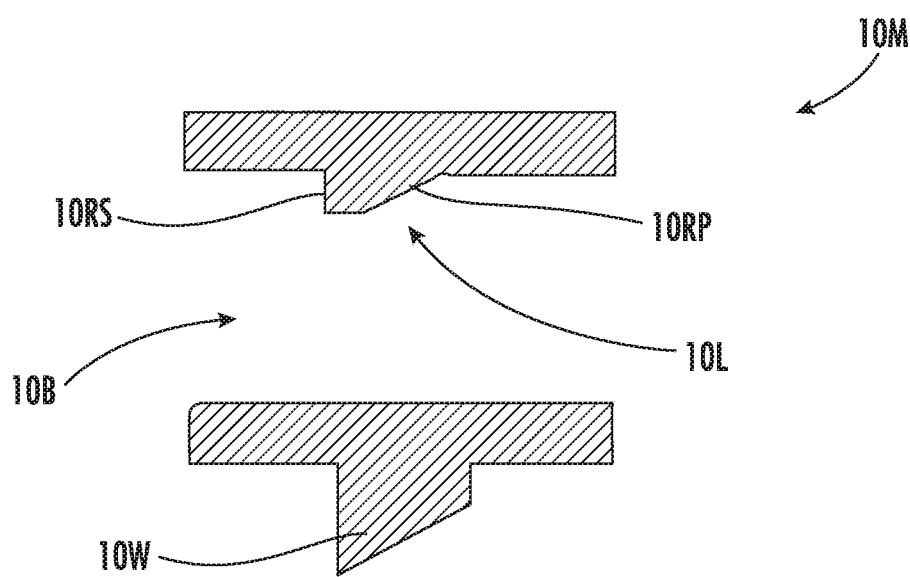
FIG. 11A is a cross-sectional view of the securing feature of FIG. 11.

Details of the locking feature 10L are best shown in the cross-sectional view of FIG. 11A taken through a longitudinal vertical plane through the wedge 10W. Locking feature 10L comprises a retention surface 10RS. In this embodiment, the backside of the ramp of locking feature 10L forms a ledge that cooperates with complimentary geometry on the connector housing of connector 1. However, retention surface 10RS may have different surfaces or edges that cooperate for securing connector 10 for creating the desired mechanical retention. For instance, the retention surface 10RS may be canted or have a vertical wall for tailoring the pull-out force for the connection port 36. However, other geometries are possible for the retention surface 10RS.

As best shown in FIG. 11A, locking feature 310L is configured as ramp 10RP that runs to a short flat portion, then to a ledge that reverts to a round cross-section for creating the retention surface 10RS for engaging and retaining the connector 10 once it is fully-inserted into the connector port passageway 33 of the connection port 36. Consequently, the securing feature 10 is capable of moving to an open position (OP) when inserting a suitable connector 1 into the connector port passageway 33 since the connector housing engages the ramp 10RP pushing the securing feature downward during insertion.

The securing feature 10 translates from a retain position (RP) to an open position (OP) as a suitable connector 1 is inserted into the connection port 36. Once connector 10 is fully inserted into connector passageway 33, then the securing feature 10M automatically moves to the retain position (RP) since it is biased upwards to the retain position. This advantageously allows a plug and play connectivity of the connectors 1 with port module insert 100 without having to turn a coupling nut or a bayonet like conventional devices. Thus, connections to the port module insert may be made faster and in positions that may be awkward with relative ease.

Figure 12:
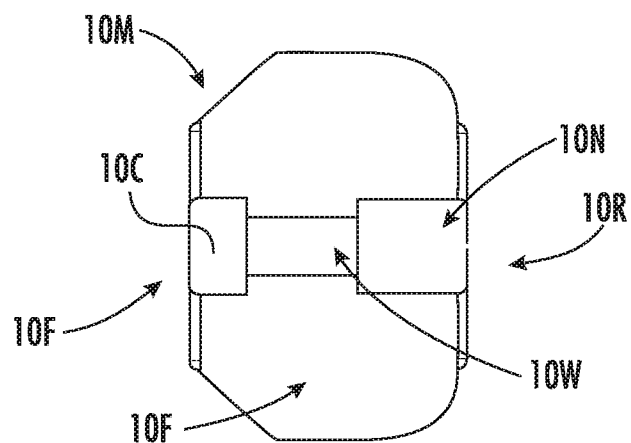
FIGS. 12-14 are various views of the securing member of FIG. 11 without the springs.
Figure 13:
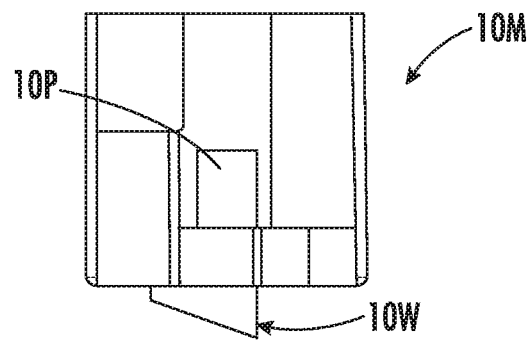
Figure 14:
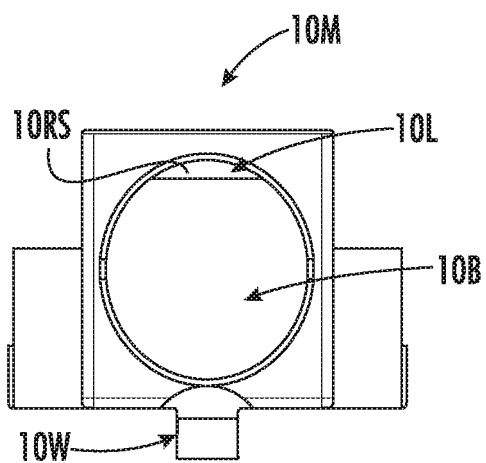

FIG. 12 is a plan view showing the wedge 10W along with the perimeter profile from the front end 10F to the rear end 10R of securing member 10W. As shown, the perimeter in this view is asymmetrical for keying the assembly of the securing feature 10M to the shape of the cavity 216 of the inner housing 21A. This ensures that the locking feature 10L on the securing member 10M has the correct orientation for connector insertion and retention in the connection port 36. FIGS. 13 and 14 depict other views of the securing feature 10M to show details of this specific design.

Figure 15:
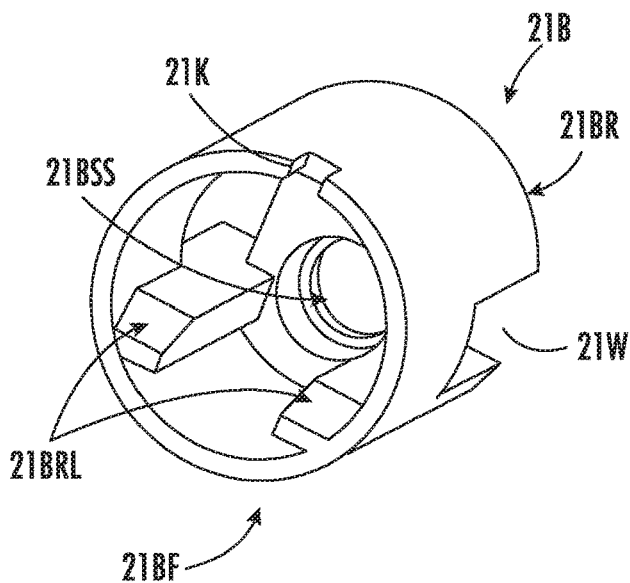
FIGS. 15-17 are perspective views of the outer housing of the port module insert of FIG. 5.
Figure 16:
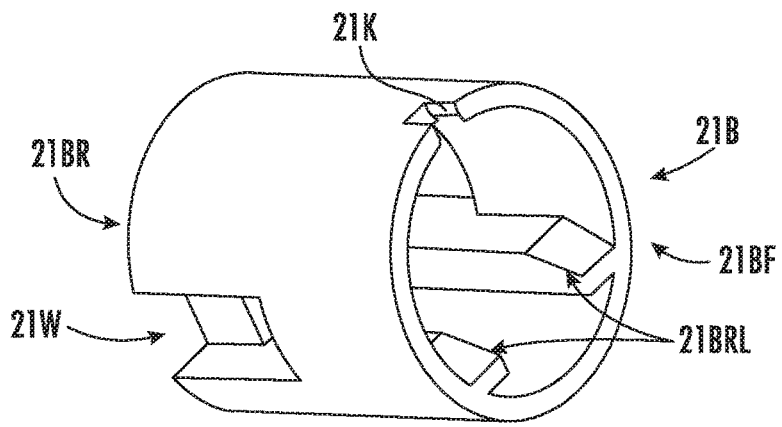
Figure 17:
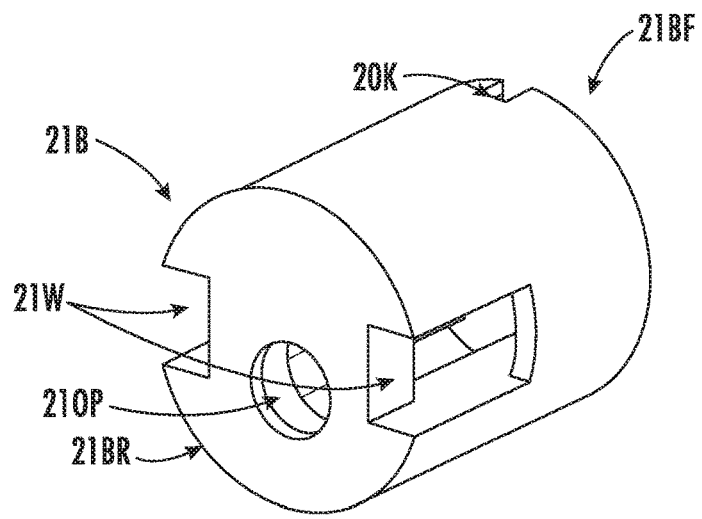

FIGS. 15-17 show perspective views of the outer housing 21B of port module insert 100. Outer housing 21B comprises a front end 21BF having a large opening leading to a cavity that receives the inner housing 21A, and a rear end 21BR. As depicted, rails 21BRL cooperate with the slots 21S on the inner housing 21A for aligning the portions of the housing 21. One or more windows 21W cooperate with latch arms for securing the inner housing 21A with the outer housing 21B. Outer housing also comprises an opening 21OP at the rear end 21BR for allowing a portion of adapter assembly 30 through. Specifically, adapter assembly 30 with the resilient member 30R are installed from the cavity of the outer housing 21B so that the resilient member 30R is seated in the spring seat 21BSS between the outer housing 21B and a flange of the adapter 30. Once positioned the inner housing 21A can be inserted into the cavity for trapping the adapter 30 and resilient member 30R between the inner and outer housings. Outer housing 21B may also have one or more keys for fine alignment of the inner housing 21A as well.

Figure 18:
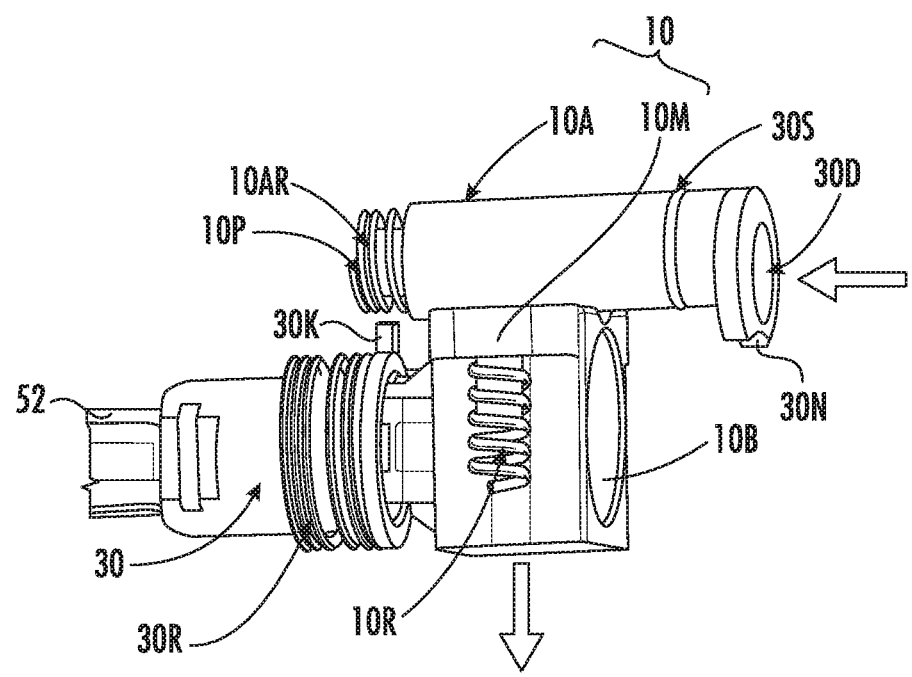
FIG. 18 is a perspective view of the construction of the port module insert with the housing removed for showing the cooperation between the actuator and securing member of FIG. 5.
Figure 19:
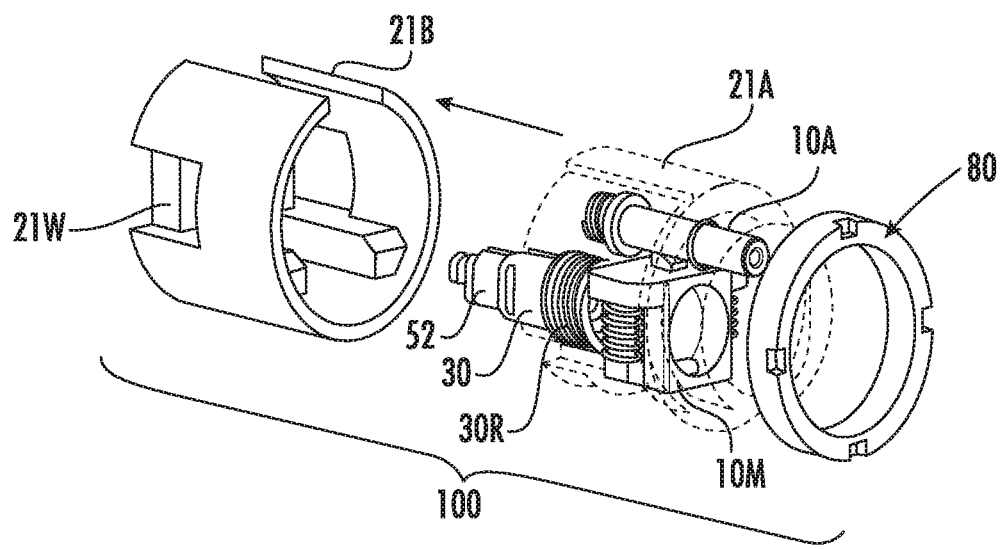
FIG. 19 is a perspective view of the construction of the internal components of port module insert of FIG. 5 with the inner housing shown in phantom lines.

FIG. 18 shows the cooperation of the securing feature 10 components within the housing 21 along with the adapter assembly 30 and a resilient member 30R. As actuator 10A moves forward, the motion moves the securing member 10M in a transverse direction to an open position for releasing a connector as depicted by the arrows. A rear connector 52 may be received in the adapter assembly 30 for making an optical connection with the external connector 1 that may be inserted into the connection port 36. By way of example, the rear connector 52 may be a SC, LC or any other suitable connector as desired.

As shown, adapter assembly 30 is aligned with the connection port passageway 33 of connection port 36 when assembled. Adapter assembly 230A is suitable for aligning the ferrule of connector 1 inserted into connection port 36 with the rear connector 52 that may be received in the adapter assembly 30. Consequently, rear connector 52 disposed with a closure, multiport or other device may be optically mated with the external connector 1. Adapter assembly 30 may also comprise a ferrule sleeve (not visible) if desired. If used, ferrule sleeve receives a portion of the respective ferrule of connector 1 for precision alignment. The adapter assembly 30 is biased forward by resilient member 30R and allows the adapter assembly 30 to "float".

Actuator 10A provides a follower or cam surface that engages with the wedge 10W of securing member 10M. The follower or cam surface may be disposed within a longitudinal groove of actuator 10A for allowing nesting of the components and a more compact form-factor or not. Actuator 10A also includes a push-button (not numbered) at the front end and a post (not numbered) at a rear end for receiving the resilient member 10AR. The push-button at the front end may have a notch 10AN for nesting the position of the actuator 10A and allowing the external connector to be inserted into the connection port 36.

FIG. 19 shows the assembly of inner housing 21A loaded with components for assembly into the outer housing 21B. For clarity, the outline of inner housing 21A is shown in phantom lines for showing details. The interface between components of the housing 21 may have other structure or features for securing or sealing the inner housing 21A to the outer housing 21B such as fasteners for securing the components of the housing or an adhesive, o-ring or gasket or weldable feature for sealing. Any of the port module inserts 100 disclosed herein may optionally be weatherproof by appropriately sealing seams of the housing 21 between components using any suitable means such as gaskets, O-rings, adhesive, sealant, welding, overmolding or the like.

Further details of the actuator 10A and are discussed next in relation to FIG. 20. One or more sealing feature 10S may be disposed on the actuator 10A. Sealing feature 10S provides a seal between the actuator 10A and the securing feature passageway 45 to inhibit dirt, dust and debris from entering the device. Sealing member 10S may be seated in a retention groove. Actuator 10A may also include a dimple 10AD on the push-button for providing a tactical feel for the user. Securing features 10 may also be a different color or have a marking indicia for identifying the port type or count.

Port module insert or housings 21 may have any suitable shape, design or configuration as desired such as non-round. FIG. 22 depicts a plurality of port module inserts 100' having a non-round shape that is similar to port insert modules disclosed. In this embodiment, the port insert modules 100' are rectangular and each comprise a plurality of connection ports 36. The device 600 is configured to receive a plurality of port insert modules 100'.

Port module inserts may have still other constructions using the concepts disclosed. By way of example, FIGS. 23-29 depict views of port module insert 100" similar to the port module insert 100 of FIGS. 3 and 4, except they use other mechanisms with for securing feature 10. For the sake of brevity, the differences of port module insert 100" will be explained in detail and other features or constructions are similar to port module inserts disclosed herein.

Figure 23:
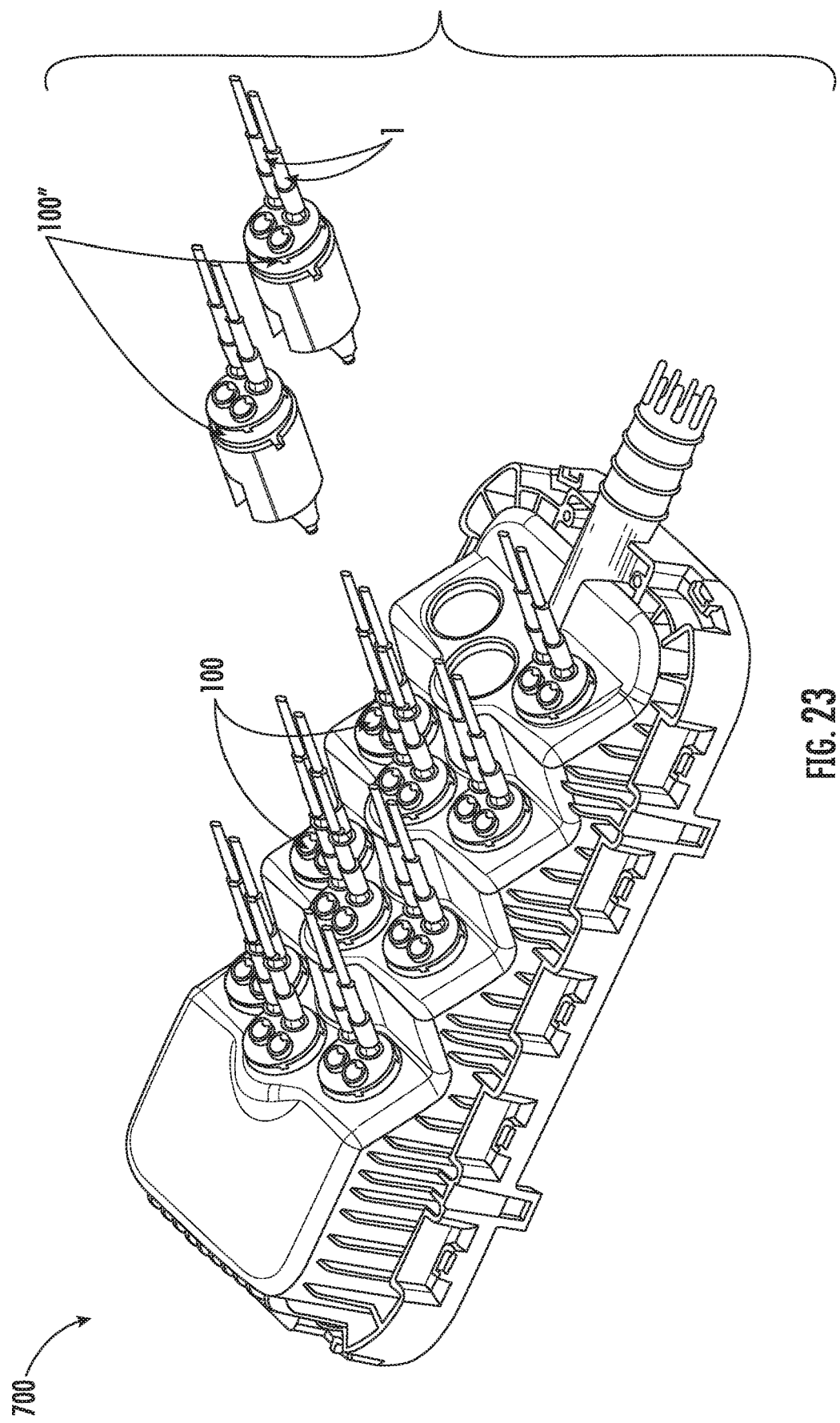
FIG. 23 is a perspective views of another port module insert having two connection ports according to the concepts disclosed and being installed into a multiport.

FIG. 23 shows port module inserts 100" being installed into a conventional multiport 700. The conversion from conventional adapters for hardened connector to the port modules doubles the density of the multiport by having two connections occupying each aperture. The dual-port arrangement of port module insert 100" uses a different securing member 10M than port module insert 100. More specifically, a single securing member 10M is used for both connection ports 36, and separate locking features 310L and actuators 310A are used for cooperating with the individual external connectors 1.

Figure 24:
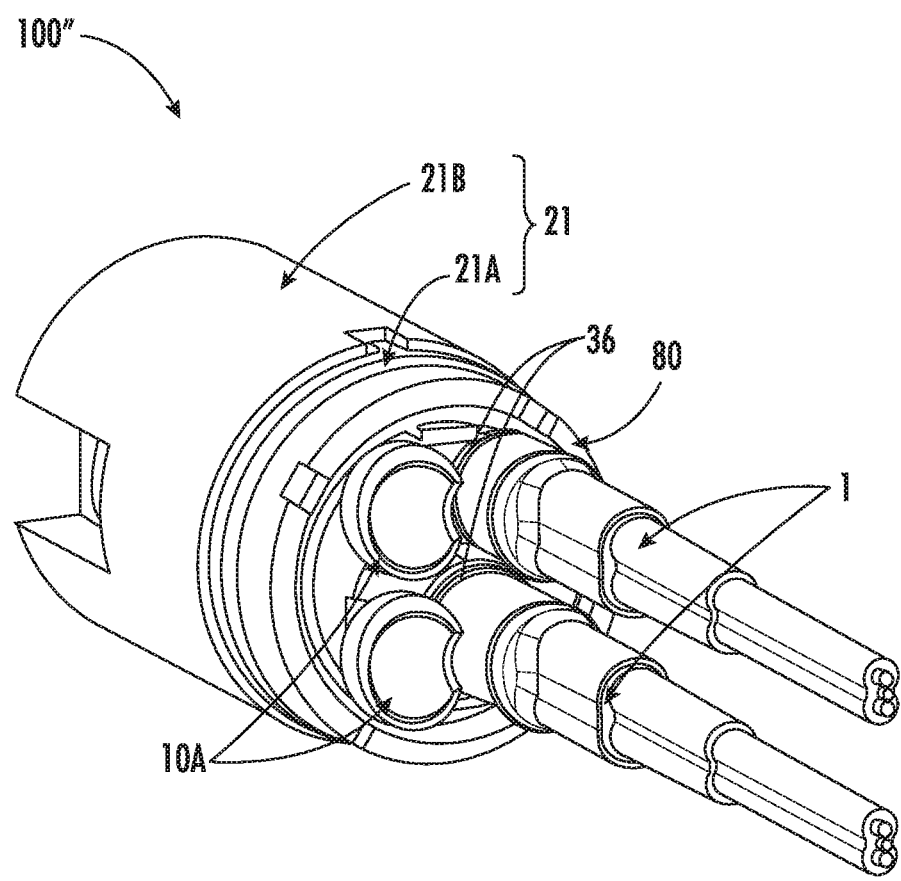
FIG. 24 is a perspective view of the port module insert of FIG. 23 with two external fiber optic connectors inserted and secured in the connection port for making an optical connections.
Figure 25:
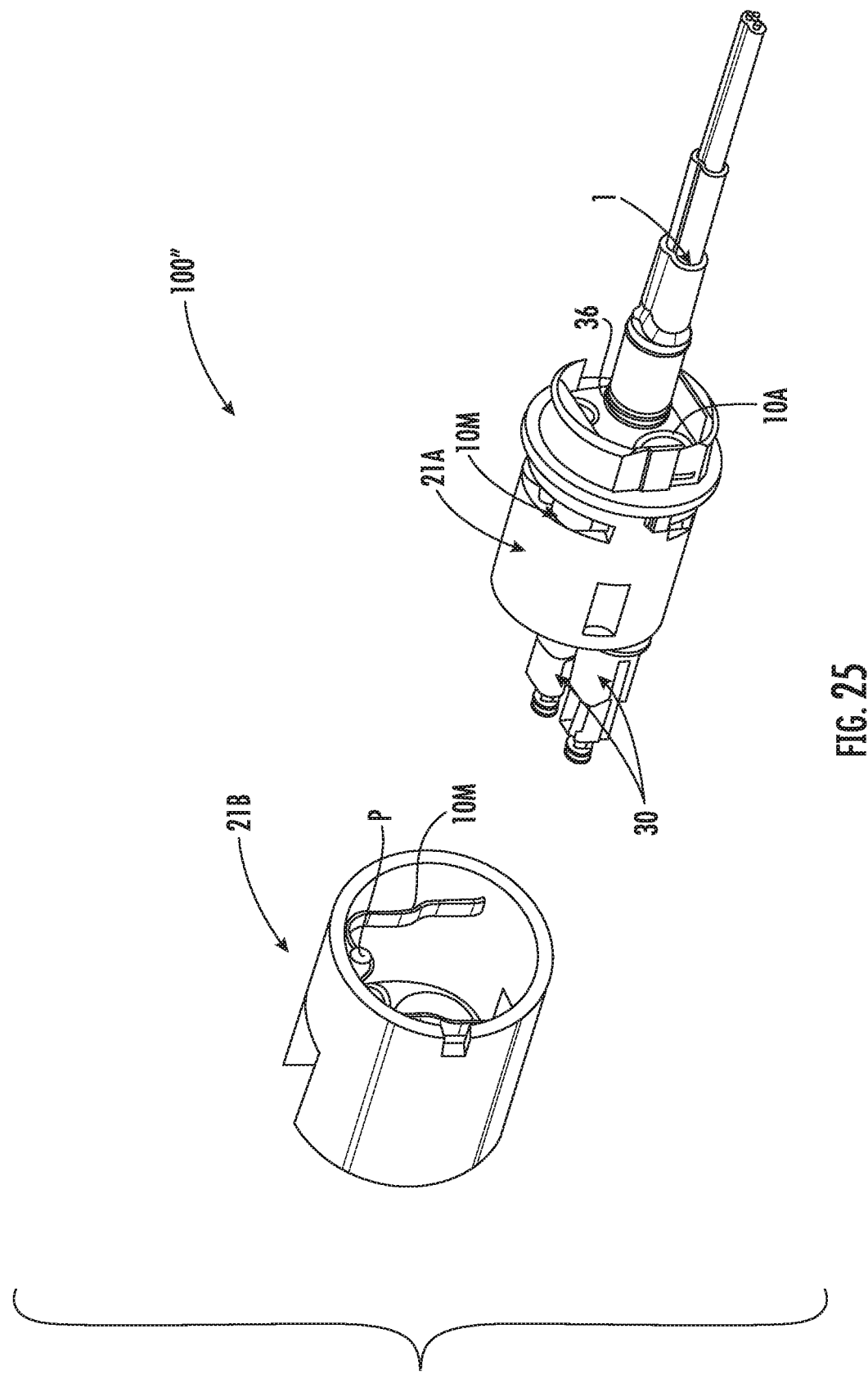
FIG. 25 is partially exploded view of the port module insert of FIG. 23 and FIG. 24 the inner housing assembly removed from the outer housing.

FIG. 24 is a perspective view of the port module insert 100" with connectors 1 secured in the respective connection ports 36. FIG. 25 depicts the inner housing 21A assembled with the components and ready to insert into the cavity of the outer housing 21B. In this view, the securing member 10M is also shown on the inside the cavity to depict how it cooperates with a pin P of the outer housing 21B. Specifically, pin P acts and an isolator on securing member 10M for inhibiting movement in the other arm of the securing member 10M if one side is deflected outward to release a connector.

Figure 26:
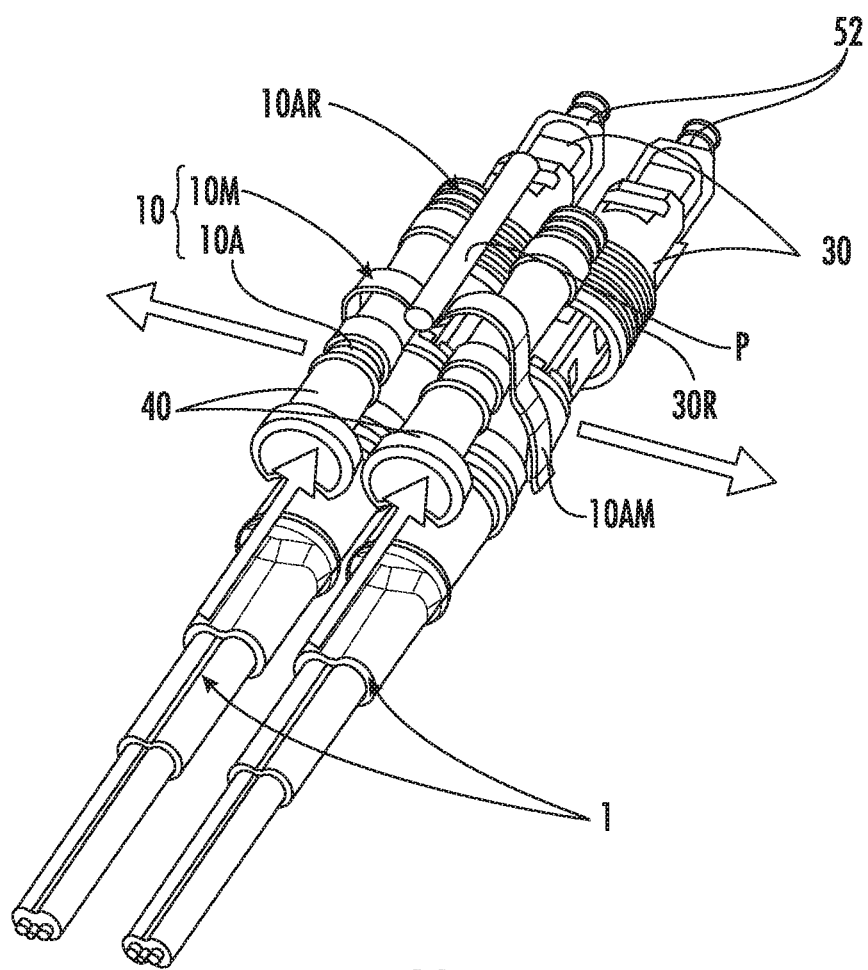
FIGS. 26 and 27 are perspective views of the internal construction and operation of the port module insert of FIGS. 23-25 with the housing removed for showing the cooperation between the actuator and securing member.
Figure 27:
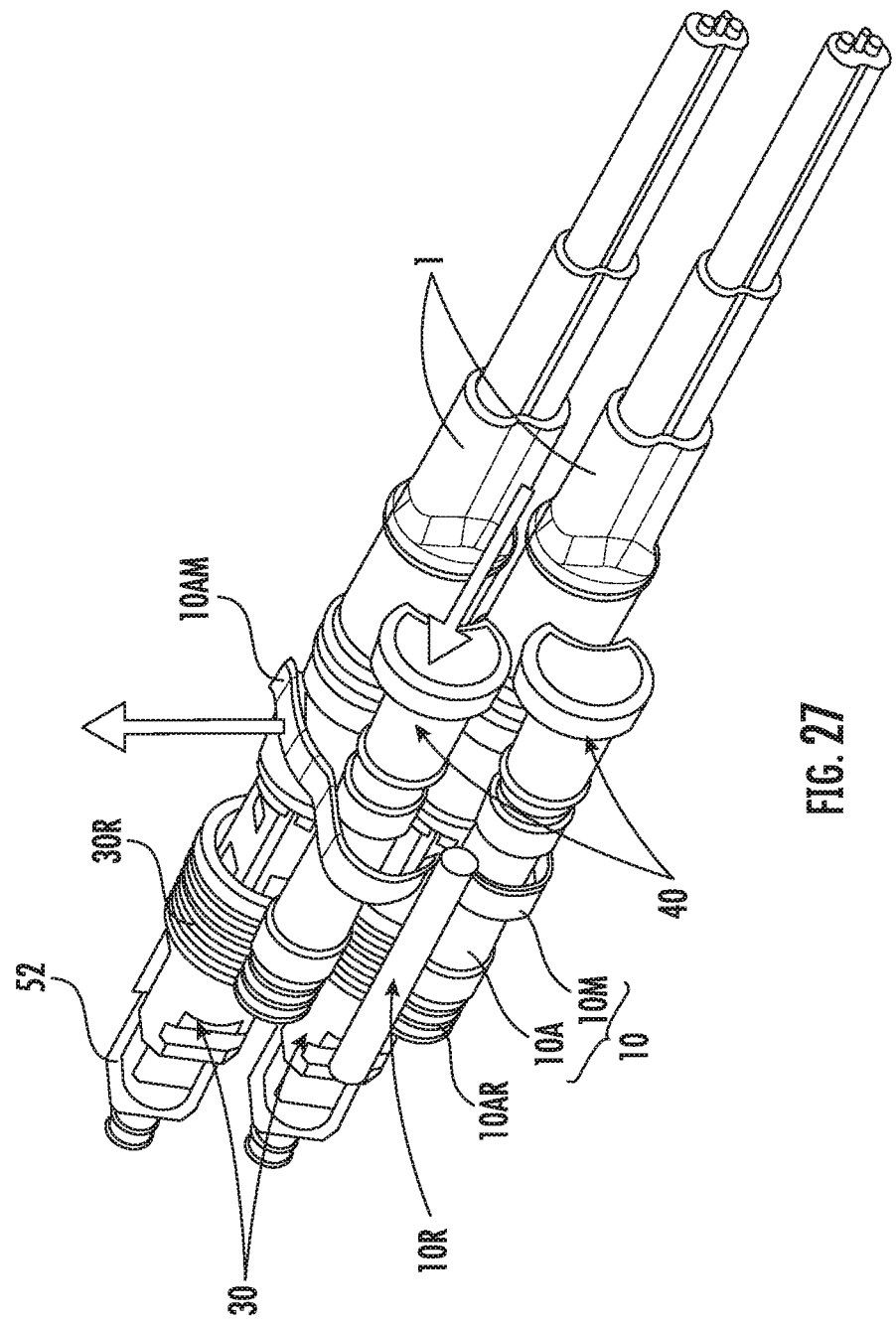

FIGS. 26 and 27 are perspective views showing how the actuators 10A may deflect an individual arms of securing member 310M for moving the one-side of securing member 10M to an open position for releasing the connector 1 from connection port 36. The views in FIGS. 26 and 27 have the housing 21 removed for clarity.

Figure 28:
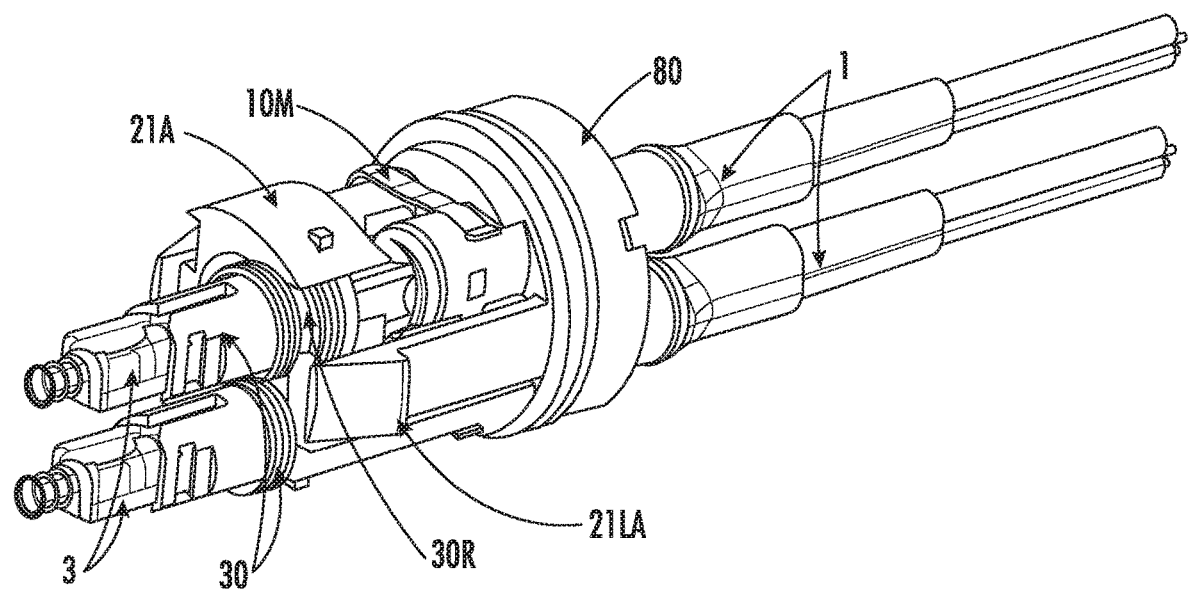
FIG. 28 is a perspective view of the of the inner housing assembly of the port module insert of FIGS. 23-27 with the outer housing removed for clarity.
Figure 29:
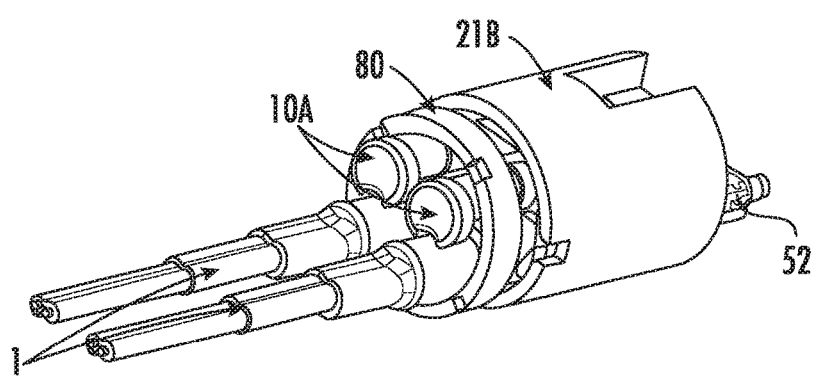
FIG. 29 is a perspective view of the assembled port module insert of FIGS. 23 and 28 with the external fiber optic connectors attached.

Port module insert 100" comprises securing features 10 comprising actuators 10A and a common securing member 10M. Specifically, securing member 10M comprises a spring clip that may be elastically deformed by actuators 10A when pushed (or upon insertion of a suitable connector 10 into connection port 36) and the securing member 10M springs back to engage a suitable portion of external connector 1 such as locking feature of connector housing when the actuator 10A is released or when connector 1 is fully-seated within the connection port 36. As best shown in FIG. 26, the securing member 10M comprises a securing feature 10M comprising arms 10AM that deflect outward with the cam surface of actuator 10A. Arms 10AM may have an edge portion that act as a locking feature 10L for the suitable connector 1. By way of explanation, the edge portions of arms 10AM engage the locking feature of the connector housing for securing the connector 1. In order to release the connector 1 from the connection port 36, the arms 10AM and locking features 10L on the arms 10AM are translated outward. Securing member 10M may be formed from any suitable material such as a spring steel and have a suitable geometry for retaining a connector 1. This advantageously allows a push and play connectivity of the connectors 1 with port module insert 100" without having to turn a coupling nut or a bayonet like conventional connections. Thus, connections to the port module insert may be made faster and in positions that may be awkward with relative ease. FIG. 28 is a perspective view of the assembly of components of port insert module 100" in the inner housing 21A. FIG. 29 is a perspective view of the assembled port module insert 100".

Any of the port module inserts 100 may also have one or more dust caps (not shown) for protecting the connection port 36 from dust, dirt or debris entering the port module insert or interfering with the optical performance. Thus, when the user wishes to make an optical connection to the port module insert, the appropriate dust cap is removed and then connector 1 of cable assembly may be inserted into the respective connection port 36 for making an optical connection to the port module insert. Dust caps may use similar release and retain features as the connectors 1. By way of explanation, when the actuator 10A is pushed inward, the dust cap is released and may be removed. Moreover, the interface between the connection ports 36 and the dust cap or connector 1 may be sealed using appropriate geometry and/or a sealing element such as an O-ring or gasket on the connector or dust cap. If the port module insert 100 is intended for indoor applications, then the weatherproofing may not be required.

To make identification of the connection ports or easier for the user, a marking indicia may be used such as text or color-coding for the connection ports 36 of port module inserts.

The present application also discloses methods for making port module inserts. One method of making a port module insert comprises the steps of providing a housing having an inner housing and an outer housing along with at least one securing feature. The inner housing comprises at least one connection port having an optical connector opening extending from an outer surface of the inner housing into a cavity and defining a connection port passageway, and at least one securing feature passageway. The method includes assembling at least one securing feature being so it is associated with the connection port passageway, wherein a portion of the at least one securing feature is disposed within a portion of the at least one securing feature passageway. Other methods for making port module inserts as disclosed herein are also contemplated.

Another method of making a port module insert comprises the steps of providing a housing having an inner housing and an outer housing along with at least one securing feature. The inner housing comprises at least one connection port having an optical connector opening extending from an outer surface of the inner housing into a cavity and defining a connection port passageway, and at least one securing feature passageway. The method includes assembling at least one securing feature being so it is associated with the connection port passageway, wherein a portion of the at least one securing feature is disposed within a portion of the at least one securing feature passageway. The method also includes assembling at least one securing feature resilient member for biasing a portion of the at least one securing feature.

The methods disclosed may further include steps or features as disclosed herein for making port module inserts where the securing feature may translate between an open position and a retain position. The method may include translating the securing feature for moving the securing feature to the open position and the securing feature 310 is biased to retain position RP.

Although the disclosure has been illustrated and described herein with reference to explanatory embodiments and specific examples thereof, it will be readily apparent to those of ordinary skill in the art that other embodiments and examples can perform similar functions and/or achieve like results. For instance, the connection port module insert may be configured as individual sleeves that are inserted into a passageway of a device, thereby allowing the selection of different configurations of connector ports for a device to tailor the device to the desired external connector. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

We claim:

1. A port module insert for making an optical connection, comprising:
   a housing comprising an inner housing and an outer housing, the inner housing comprising at least one connection port having an optical connector opening extending from an outer surface of the inner housing into a cavity and defining a connection port passageway, and at least one securing feature passageway;
   at least one securing feature associated with the connection port passageway comprising an actuator and securing member, wherein a portion of the at least one securing feature is disposed within a portion of the at least one securing feature passageway, wherein the actuator is used for releasing an external fiber optic connector from the connection portion and is configured for moving in a direction aligned with the connection port.

2. The port module insert of claim 1, further comprising at least one securing feature resilient member for biasing a portion of the at least one securing feature, and the at least one securing feature comprises a bore with a locking feature disposed within the bore, wherein the locking feature comprises a ramp with a ledge.

3. A port module insert for making an optical connection, comprising:
   a housing comprising an inner housing and an outer housing, the inner housing comprising at least one connection port having an optical connector opening extending from an outer surface of the inner housing into a cavity and defining a connection port passageway, and at least one securing feature passageway; and
   at least one securing feature associated with the connection port passageway comprising an actuator and securing member, wherein a portion of the at least one securing feature is disposed within a portion of the at least one securing feature passageway, and the actuator is used for releasing an external fiber optic connector from the connection port and is configured for moving in a direction aligned with the connection port; and
   at least one securing feature resilient member for biasing a portion of the at least one securing feature.

4. The port module inserts of claim 3, wherein the at least one securing feature is capable of translating within a portion of the at least one securing feature passageway.

5. The port module insert of claim 3, wherein of the at least one securing feature is biased to a retain position.

6. A port module insert for making optical connections, comprising:
   a housing comprising an inner housing and an outer housing, the inner housing comprising at least one connection port having an optical connector opening extending from an outer surface of the inner housing into a cavity and defining a connection port passageway, and at least one securing feature passageway; and
   at least one securing feature associated with the connection port passageway comprising an actuator and securing member, wherein a portion of the at least one securing feature is disposed within a portion of the at least one securing feature passageway, and a portion of the at least one securing feature is capable of translating within a portion of the at least one securing feature passageway, and the actuator is used for releasing an external fiber optic connector from the connection port and is configured for moving in a direction aligned with the connection port.

7. The port module insert of claim 6, wherein the at least one securing feature comprises a bore that is aligned with the at least one connection port passageway with a locking feature disposed within the bore, wherein the locking feature comprises a ramp with a ledge.

8. The port module insert of claim 6, further comprising a plurality of connection ports and a plurality of securing features.

9. A port module insert for making optical connections, comprising:
   a housing comprising an inner housing and an outer housing, the inner housing comprising at least one connection port having an optical connector opening extending from an outer surface of the inner housing into a cavity and defining a connection port passageway, and at least one securing feature passageway; and
   at least one securing feature associated with the connection port passageway comprising an actuator and securing member, wherein the at least one securing feature is disposed within a portion of the at least one securing feature passageway, and the at least one securing feature comprises a bore, and a portion of the at least one securing feature is capable of translating within a portion of the at least one securing feature passageway, and the actuator is used for releasing an external fiber optic connector from the connection port and is configured for moving in a direction aligned with the connection port.

10. The port module insert of claim 9, wherein the at least one securing feature translates from a retain position to an open position as a suitable fiber optic connector is inserted into the at least one connection port, and a locking feature is disposed within the bore, wherein the locking feature comprises a ramp with a ledge.

11. The port module insert of claim 9, wherein the at least one securing feature is capable of releasing a fiber optic connector when translating within a portion of the at least one securing feature passageway.

12. The port module insert of claim 9, wherein the at least one securing feature is capable of moving to a retain position automatically when a suitable fiber optic connector is fully-inserted into the at least one connector port passageway.

13. The port module insert of claim 9, wherein the at least one securing feature comprises a locking feature.

14. The port module insert of claim 9, wherein the securing feature comprise a locking feature comprising a ramp.

15. A port module insert for making optical connections, comprising:
   a housing comprising an inner housing and an outer housing, the inner housing comprising at least one connection port having an optical connector opening extending from an outer surface of the inner housing into a cavity and defining a connection port passageway, and at least one securing feature passageway; and at least one securing feature associated with the connection port passageway comprising an actuator and securing member, wherein a portion the at least one securing feature is disposed within a portion of the at least one securing feature passageway, and the at least one securing feature comprises a bore, and a portion of the at least one securing feature is capable of translating within a portion of the at least one securing feature passageway wherein the at least one securing feature translates from a retain position to an open position as a suitable fiber optic connector is inserted into the at least one connection port, and the actuator is used for releasing an external fiber optic connector from the connection port and is configured for moving in a direction aligned with the connection port.

16. The port module insert of claim 15, wherein the bore is sized for receiving a suitable fiber optic connector therethrough.

17. The port module insert of claim 15, wherein the bore comprises a locking feature.

18. The port module insert of claim 15, further comprising at least one securing feature resilient member for biasing a portion of the at least one securing feature.

19. A port module insert for making optical connections, comprising:
a housing comprising an inner housing and an outer housing, the inner housing comprising at least one connection port having an optical connector opening extending from an outer surface of the inner housing into a cavity and defining a connection port passageway, and at least one securing feature passageway; and
at least one securing feature associated with the connection port passageway comprising an actuator and securing member, wherein the at least one securing feature comprises a bore and a locking feature, and wherein a portion the at least one securing feature translates from a retain position to an open position as a suitable fiber optic connector is inserted into the at least one connection port, and the actuator is used for releasing an external fiber optic connector from the connection port and is configured for moving in a direction aligned with the connection port.

20. The port module insert of claim 19, wherein the locking feature comprises a ramp with a ledge.

21. The port module insert of claim 20, wherein the locking feature comprises a retention surface.

22. A port module insert for making optical connections, comprising:
a housing comprising an inner housing and an outer housing, the inner housing comprising at least one connection port having an optical connector opening extending from an outer surface of the inner housing into a cavity and defining a connection port passageway, and at least one securing feature passageway; and
at least one securing feature associated with the connection port passageway, wherein a portion of the at least one securing feature is disposed within a portion of the at least one securing feature passageway, and the at least one securing feature comprises a securing member and an actuator, and the at least one securing member is capable of translating within a portion of the cavity, wherein the at least one securing member translates from a retain position to an open position as a suitable fiber optic connector is inserted into the at least one connection port, and the actuator is used for releasing an external fiber optic connector from the connection port and is configured for moving in a direction aligned with the connection port.

23. The port module insert of claim 22, further comprising at least one securing feature resilient member for biasing a portion of the at least one securing feature.

24. The port module insert of claim 22, further comprising one or more retention features between the inner housing and the outer housing.

25. The port module insert of claim 22, wherein the inner housing comprises a key for cooperating with the outer housing.

26. The port module insert of claim 22, further comprising at least one adapter aligned with the at least one connection port.

27. The port module insert of claim 26, at least one adapter is capable of floating relative with respect to the at least one connection port.

28. The port module insert of claim 26, further comprising at least one adapter biased by a resilient member.

29. The port module insert of claim 22, wherein the at least one securing feature translates from a retain position to an open position as a suitable fiber optic connector is inserted into the at least one connection port.

30. The port module insert of claim 22, wherein the connection port further comprises a keying portion.

31. The port module insert of claim 30, wherein the keying portion comprises a male key.

32. The port module insert of claim 22, further comprising a sealing feature disposed on the at least one securing feature.

33. The port module insert of claim 22, wherein at least a portion of the one securing feature passageway is arranged in the same direction as a longitudinal axis of the connector port passageway.

34. The port module insert of claim 22, further comprising at least one rear connector comprising a rear connector ferrule.

35. The port module insert of claim 34, the at least one rear connector having a SC footprint.

36. The port module insert of claim 22, wherein the port module insert is weatherproof.

37. The port module insert of claim 22, further comprising a coupling nut.

38. The port module insert of claim 22, wherein the port module insert comprises a marking indicia for the at least one connection port.

39. The port module insert of claim 22, wherein at least one connection port is suitable for retaining a suitable fiber optic connector when the fiber optic connector is fully-seated within the at least one connection port.

40. A method of making a port module insert, comprising:
providing a housing having an inner housing and an outer housing, the inner housing comprises at least one connection port having an optical connector opening extending from an outer surface of the inner housing into a cavity and defining a connection port passageway, and at least one securing feature passageway;
assembling at least one securing feature comprising an actuator and securing member so it is associated with a connection port passageway, wherein a portion of the at least one securing feature is disposed within a portion of the at least one securing feature passageway, and the actuator is used for releasing an external fiber optic connector from the connection port and is configured for moving in a direction aligned with the connection port.

41. A method of making a port module insert, comprising:
providing a housing having an inner housing and an outer housing, the inner housing comprises at least one connection port having an optical connector opening extending from an outer surface of the inner housing into a cavity and defining a connection port passageway, and at least one securing feature passageway;
assembling at least one securing feature comprising an actuator and securing member so it is associated with a connection port passageway, wherein a portion of the at least one securing feature is disposed within a portion of the at least one securing feature passageway, wherein the actuator is used for releasing an external fiber optic connector from the connection port and is configured for moving in a direction aligned with the connection port; and
installing at least one securing feature resilient member for biasing a portion of the at least one securing feature.

42. The method of claim 41, wherein a portion of the at least one securing feature translates from a retain position to an open position as a suitable fiber optic connector is inserted into the at least one connection port.

43. The method of claim 41, wherein the at least one securing feature is capable of releasing a fiber optic connector when translating within a portion of the at least one securing feature passageway.

44. The method of claim 41, wherein the at least one securing feature is capable of moving to a retain position automatically when a suitable fiber optic connector is fully-inserted into the at least one connector port passageway.

45. The method of claim 41, wherein the at least one securing feature comprises a locking feature.

46. The method of claim 41, wherein the at least one securing feature comprises a locking feature, wherein the locking feature comprises a ramp with a ledge.

* * * * *

UNITED STATES PATENT AND TRADEMARK OFFICE
CERTIFICATE OF CORRECTION

PATENT NO. : 11,300,746 B2
APPLICATION NO. : 16/661987
DATED : April 12, 2022
INVENTOR(S) : Thierry Luc Alain Dannoux et al.

It is certified that error appears in the above-identified patent and that said Letters Patent is hereby corrected as shown below:

On the Title Page

In Column 1, item [63], in "Related U.S. Application Data", Line 2, delete "and a" and insert -- which is a --.

Page 9, in Column 2, item [56], under "Other Publications", Line 5, delete "lopp" and insert -- loop --.

Page 9, in Column 2, item [56], under "Other Publications", Line 11, delete "Poeceedings" and insert -- Proceedings --.

In the Claims

In Column 15, Line 57, in Claim 4, delete "inserts" and insert -- insert --.

Signed and Sealed this
Fourteenth Day of June, 2022

Katherine Kelly Vidal
*Director of the United States Patent and Trademark Office*